April 2, 1968 S. Y. STERNUNG 3,376,393
METHOD OF AND APPARATUS FOR PROVIDING DIFFERENT RELEASE SIGNALS WITH DETECTION OF SEARCH BUSY OR CUT-THROUGH BUSY CONDITION IN A SATURATION SIGNALLING SYSTEM
Filed Sept. 22, 1964 6 Sheets-Sheet 1
FIG. 1-A
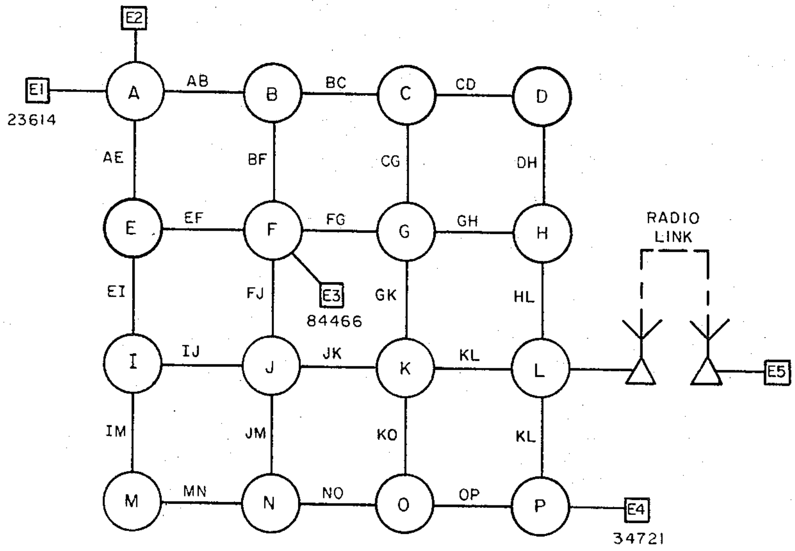
FIG. 1-B
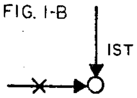
FIG. 1-C
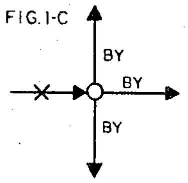
FIG. 1-F
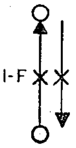
FIG. 1-D
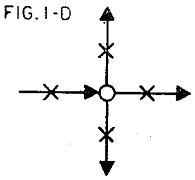
FIG. 1-E
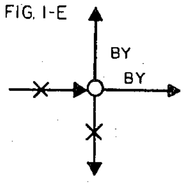
INVENTOR.
SVEN Y. STERNUNG
BY Brown Jackson Boettcher & Dienner April 2, 1968 S. Y. STERNUNG 3,376,393
METHOD OF AND APPARATUS FOR PROVIDING DIFFERENT RELEASE SIGNALS WITH DETECTION OF SEARCH BUSY OR CUT-THROUGH BUSY CONDITION IN A SATURATION SIGNALLING SYSTEM
Filed Sept. 22, 1964 6 Sheets-Sheet 2
FIG. 1-G
CALL FROM E1 TO E4
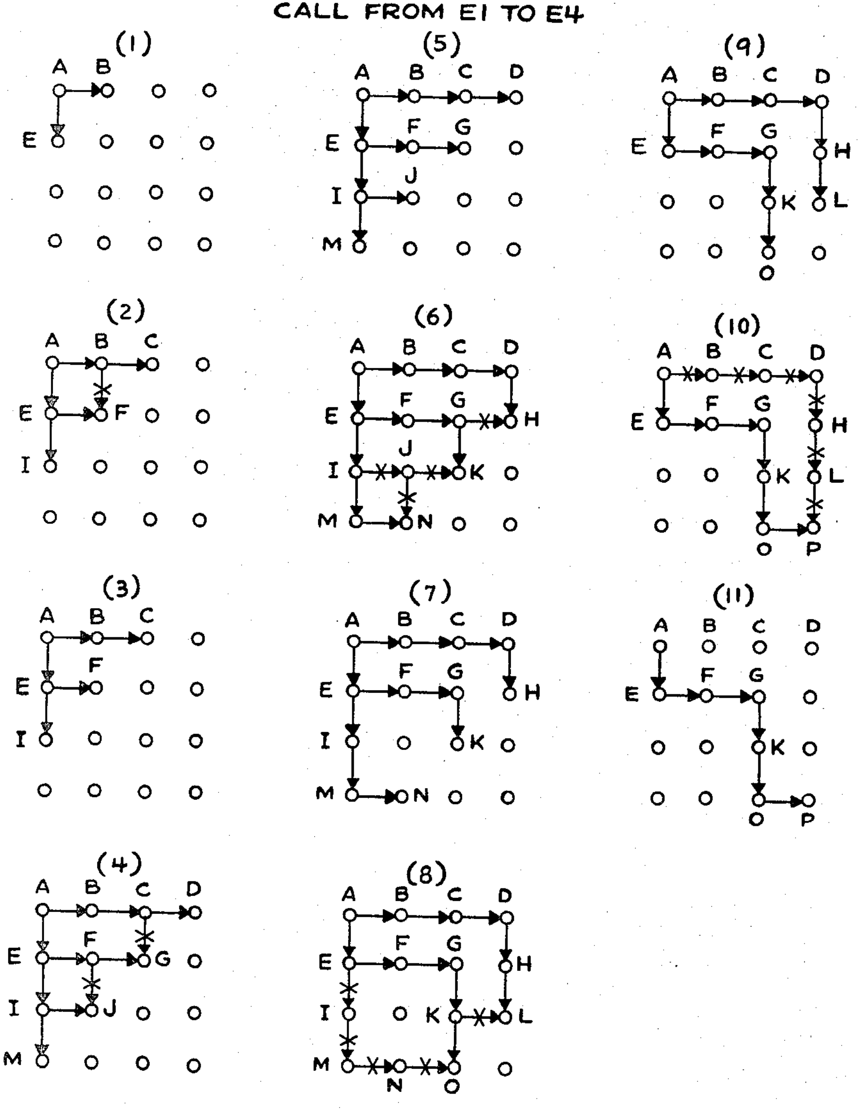
INVENTOR.
SVEN Y. STERNUNG
BY Brown Jackson Boettcher & Dienner April 2, 1968 S. Y. STERNUNG 3,376,393
METHOD OF AND APPARATUS FOR PROVIDING DIFFERENT RELEASE SIGNALS WITH DETECTION OF SEARCH BUSY OR CUT-THROUGH BUSY CONDITION IN A SATURATION SIGNALLING SYSTEM
Filed Sept. 22, 1964 6 Sheets-Sheet 3
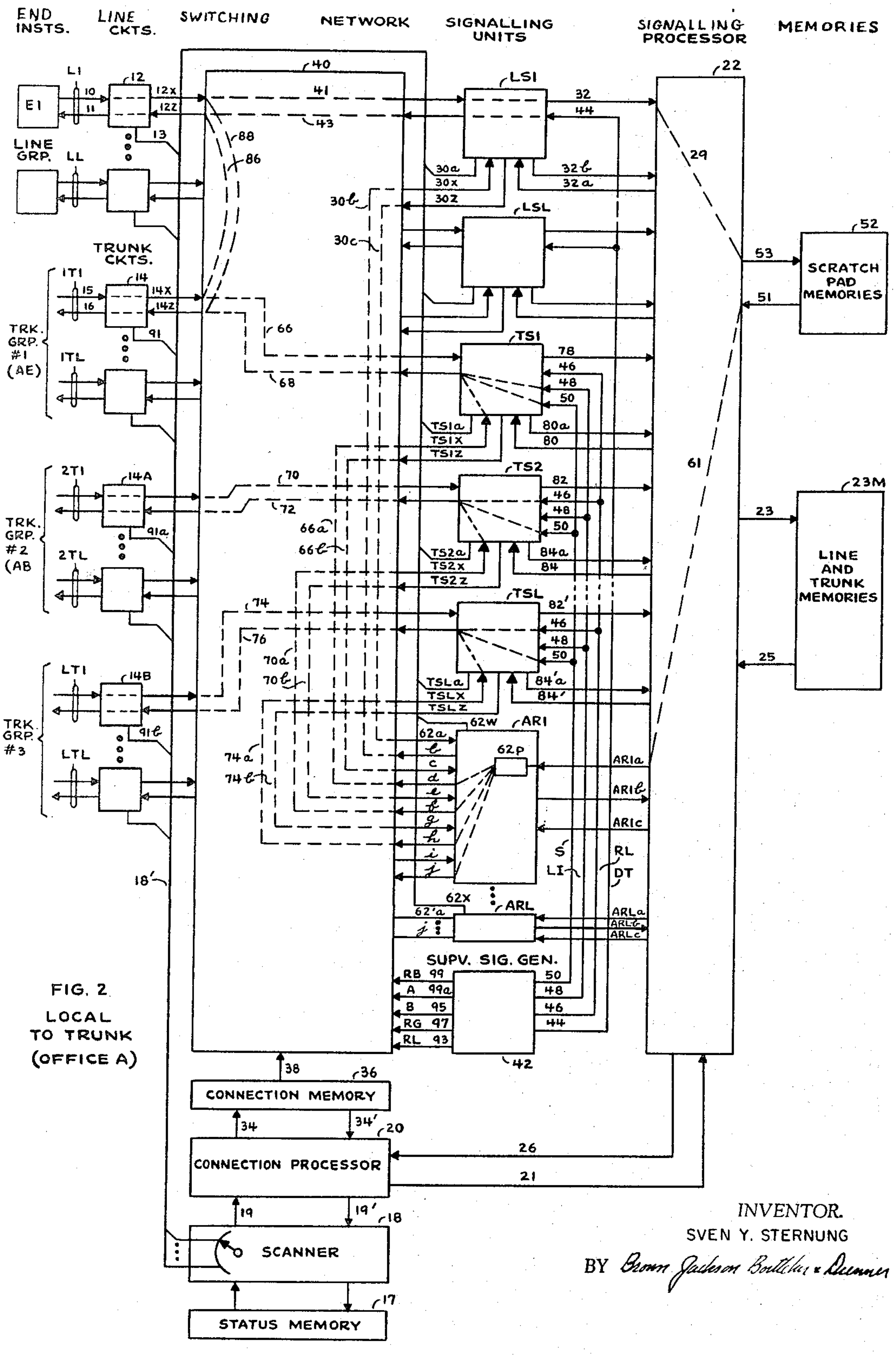
FIG. 2 LOCAL TO TRUNK (OFFICE A)
INVENTOR.
SVEN Y. STERNUNG
BY Brown Jackson Boettcher & Dienner April 2, 1968 S. Y. STERNUNG 3,376,393
METHOD OF AND APPARATUS FOR PROVIDING DIFFERENT RELEASE SIGNALS WITH DETECTION OF SEARCH BUSY OR CUT-THROUGH BUSY CONDITION IN A SATURATION SIGNALLING SYSTEM
Filed Sept. 22, 1964 6 Sheets-Sheet 4
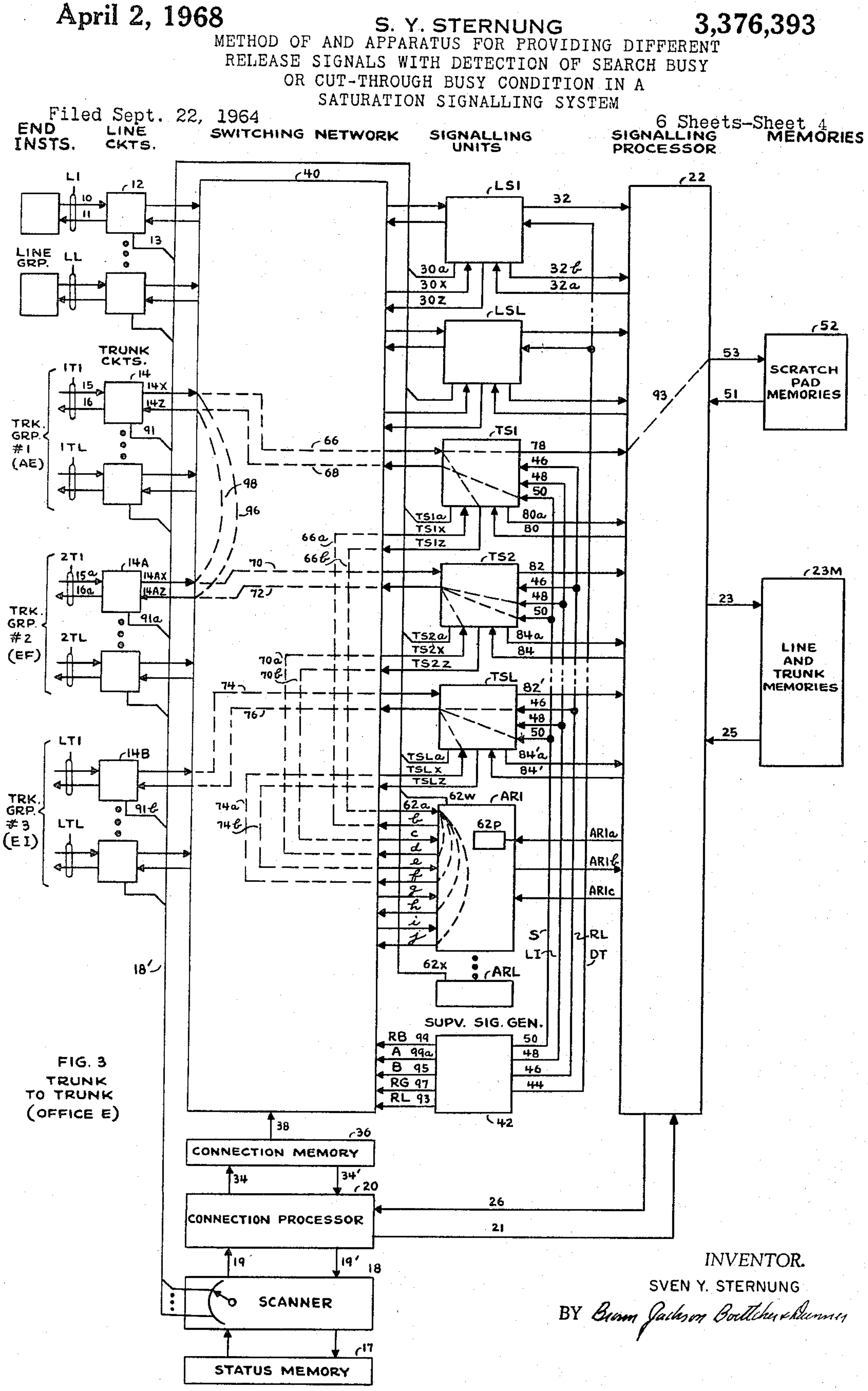
FIG. 3 TRUNK TO TRUNK (OFFICE E)
INVENTOR.
SVEN Y. STERNUNG
BY Brown Jackson Boettcher & Dienner INVENTOR.
SVEN Y. STERNUNG
BY Brown, Jackson, Boettcher & Dienner FIG. 5-A
SCRATCH PAD MEMORIES 52
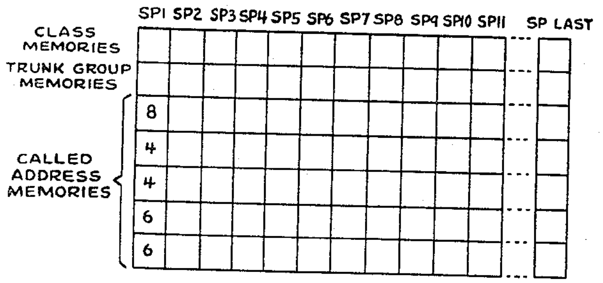
FIG. 5-B
LINE AND TRUNK MEMORIES 23 M
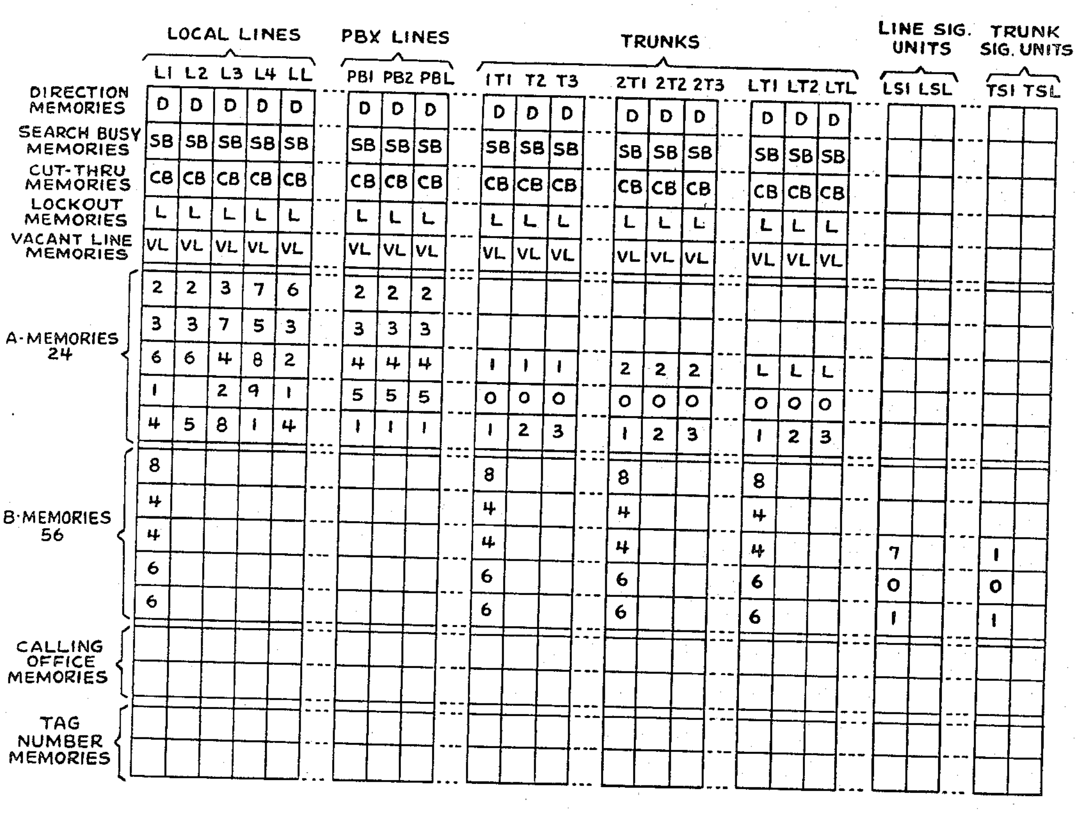
INVENTOR.
SVEN Y. STERNUNG
BY Brown Jackson Boettcher & Dienner 3,376,393

METHOD OF AND APPARATUS FOR PROVIDING DIFFERENT RELEASE SIGNALS WITH DETECTION OF SEARCH BUSY OR CUT-THROUGH BUSY CONDITION IN A SATURATION SIGNALLING SYSTEM

Sven Y. Sternung, Columbus, Ohio, assignor to North Electric Company, Galion, Ohio, a corporation of Ohio Filed Sept. 22, 1964, Ser. No. 398,368
7 Claims. (Cl. 179—18)

ABSTRACT OF THE DISCLOSURE

A saturation signalling system having the ability when a call enters a switchboard which is already handling another call to the same addressee in a cut-through mode, to stop the search, send back a lock-in signal (even though the addressee is not listed as a local subscriber in such switchboard) and thereafter a release signal to indicate to the originating office that the addressee terminal was busy. In the case of a call to the same addressee in the search-busy mode, a release signal alone is returned to release the incoming trunk over which the call is received, and the call may continue its spread over the other paths which may have been selected.

This invention relates to communication systems, and more particularly to communication systems incorporating equipment which automatically effects alternate routing of calls to any address in the system.

Many arrangements of alternate routing for communication systems, and particularly telephone systems having central offices connected by groups of trunks or channels, have been proposed and attempted heretofore. However, most conventional systems have not been able to capitalize to the fullest extent on the capabilities of alternate routing due to certain inherent limitations in the proposed arrangements.

Recently a new exceptional approach to alternate routing, identified in the art as "Saturation Signalling," has been made, embodiments of which are set forth in U.S. Patent 3,111,559 and in U.S. Patent 3,316,354. A saturation signalling system basically comprises a communication network having a plurality of automatic central offices interconnected by groups of communication channels. The term "Saturation Signalling" itself refers to the method and means used in locating a destination, such as a called office, or a called party in a system of such type.

A saturation signalling system can be further characterized as a system in which (1) there is no central control of the networks; (2) there is a unique address for each destination of the system; (3) the called station can be reached without the calling station or calling office having knowledge of the location in the system of the called station (in a security system, this feature is of considerable value); (4) a call spreads through the system over available paths between offices until it reaches its destination, redundant paths being released.

In operation, briefly, when a call to a non-local destination is originated at a station in a network which uses saturation signalling, the called address of the desired station is propagated from the originating office over a channel or trunk, if available, in every outgoing route to each office connected thereto. Such manner of propagation is repeated at each intermediate office over a channel or trunk, if available, in every route except the incoming route until the office including the station having the propagated called address is reached. When the destination office is reached a connecting path is "locked-in" between the originating office and the destination office by a reverting signal. The reverting signal effects the release of redundant branches which have not already been released as it progresses back toward the originating office.

It will be apparent that saturation signalling provides many advantages, a few of which include:

(1) Standardization of design and structure of automatic central offices.

(2) A more practical use of the alternate routing principle as all channels in the system are eligible to handle any call. The higher degree of survivability is achieved since all paths are tried, i.e., if only a single path exists between the originating and terminating points, this path will be found and the call will be connected over the path.

(3) Automatic selection of the available route which requires the least amount of connection time.

(4) Register equipment at the central office of a more simple construction, since the central office is not required to store information which relates to the configuration of the network as a whole, or as to the connection of stations at other central offices.

(5) A system having a high degree of flexibility in the field. For example, if a station transfers from one central office to another, it is only necessary to erase the address from the one central office and write it in the memory of the other, with no change in the common system printed directory. If a called office is deleted, it is only necessary to delete the stations associated therewith from the system directory or to write them in the memory of some other existing station. If a new station is added to the system, it is only necessary to write the associated station addresses in its memory and add them to the common system directory. Also, if a central office with its associated stations is moved to a different geographical location in the system, no change in the other central offices is necessary.

(6) A system which is compatible with high speed switching.

While these advantages reside in the Saturation Signalling system, the present invention reduces the traffic load due to search traffic as faster and more efficient release of redundant signalling paths is effected. This reduces the amount of switching equipment such as registers in the central offices and, indirectly, provides a degree of improvement in the speed of search in a Saturation Signalling network as the number of routes found busy will be reduced. It is an object of the present invention to provide a novel system and method which is operative in this improved manner.

It is another object of the present invention to provide a system which is so operative, and which specifically includes control means for spreading calls and releasing redundant paths in a more efficient manner.

It is a specific object of the invention to provide a system of such type which includes means in each office for differentiating between calls in the search busy mode and calls in the cut-through busy mode.

It is another specific object to provide means whereby a first spreading call path which collides with a second path in the search mode for the same destination results in a release signal back over the incoming trunk in the first path whereas if the second path is in the cut-through busy mode, having reached the destination, a lock-in signal followed by a release signal will be propagated back over the incoming trunk in the first path.

It is another specific object to provide address regenerators which have discrete outputs which can be selectively connected to trunks for the purpose of propagating the called address whereby if all of the outgoing trunks connected thereto become released, the address regenerator can recognize this situation and initiate signals to effect the release of the incoming trunk.

These and other objects of the present invention, and its various features and advantages, will appear more fully upon consideration of the accompanying description and drawings, in which:

FIGURE 1A is a block diagram of the general system;

FIGURES 1B–1F illustrate in schematic form certain principles of operation of the system;

FIGURE 1G illustrates the manner of spread of a call and release of redundant channels in a saturation signalling system;

FIGURE 2 illustrates a central office, and the switching equipment used in a local to trunk call;

FIGURE 3 illustrates a central office, and the switching equipment used in a trunk to trunk call;

FIGURE 5A illustrates in more detail the "Scratch Pad" memories of the ssytem; and FIGURE 5B illustrates in more detail the "Line and Trunk" memories of the system.

BRIEF DESCRIPTION OF SATURATION SIGNALLING SYSTEM

Figure 4:
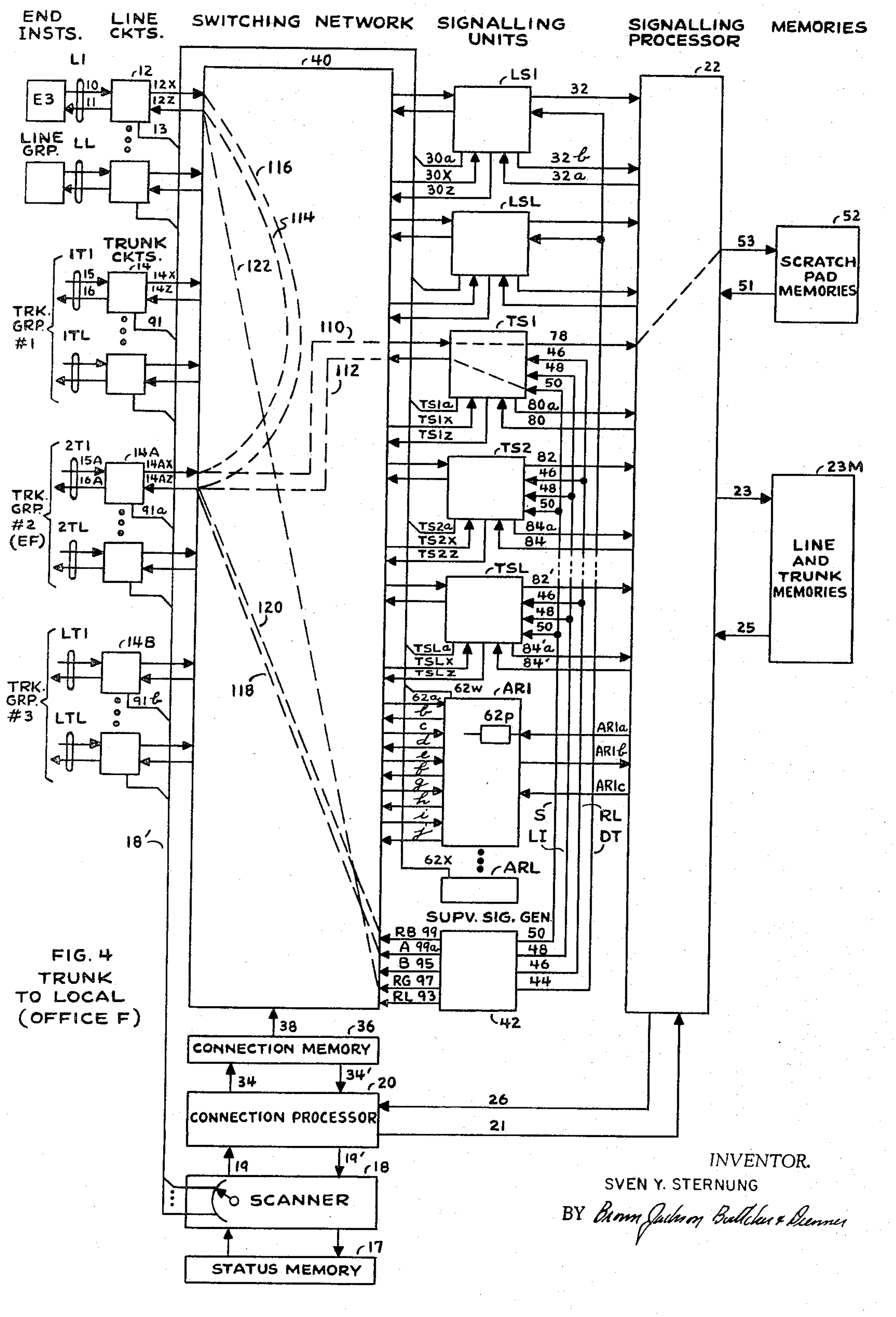
FIGURE 4 illustrates a central office, and the switching equipment used in a trunk to local call.

A communication system connected to operate in accordance with the novel saturation signalling techniques of the invention is shown in schematic form in FIGURE 1A. As there shown, the exemplary network includes sixteen central offices connected in a grid-mesh configuration, each of which is represented by a circle and each of which is designated alphabetically from A to P. Additionally, the various offices are interconnected by paths, such as path AB, which extends between offices A and B, each of which paths comprises one or more trunks or channels which may be two-way trunks having the capability of signalling in both directions simultaneously or sequentially. In the exemplary embodiment set forth herein, each path is assumed to have a plurality of trunks.

Each central office has associated therewith a group of stations, each of which has its own unique address relative to the whole network. It should be understood that each central office has many stations associated therewith, and that the stations may be telephones or end instruments of various kinds including data transmitting instruments. For illustrative purposes, stations which may comprise end instruments E1 and E2 are shown as rectangles connected to central office A; end instrument E3 is shown connected to central office F; end instrument E4 is shown connected to central office P; and end instrument E5 is shown connected by a radio link to central office L.

Each central office such as is shown in FIGURE 2, for example, comprises a switching network 40 for interconnecting lines, such as L1, trunks, such as 1T1, line signalling units such as LS1, trunk signalling units, such as TS1, address regenerators, such as AR1, and the supervisory signal generator 42. A scanner 18 constantly scans lines, trunks, line signalling units, trunk signalling units and address regenerators for change of status memory 17 containing the states between scanning operations. Upon detecting a change of state, the scanner 18 notifies the connection processor 20 of the address or identification of the line, trunk, etc., which has experienced a change of status and the new condition thereof. The connection processor communicates with the signalling processor 22 which communicates with the line signalling units, the trunk signalling units, the address regenerators, scratch pad memories 52, and line and trunk memories 23M. The signalling processor, among the various functions, sequentially scans line signalling unit and trunk signalling unit positions (each position of which may comprise several paths), via signalling paths such as **32*b*, 80*a***, etc., pausing when a request for service is detected via these leads, and starting up again after the request is handled, also scans address regenerators via leads such as AR1*b*, assigns an idle scratch pad memory such as SP1 to an incoming signalling unit, interconnects line signalling units and trunk signalling units to the scratch pad memories on each digit received so that the called address incoming over the lines and trunks can be placed therein; supervises connections between the scratch pad memories 52 and the line and trunk memories 23M to transfer the called address from the scratch pad memories 52 to the memory B position of the line and trunk memories 23M; and effects a comparison at appropriate times between the address in a given scratch pad memory and the addresses in the B and A memories of 23M.

Referring again to the scanning procedure of the signalling processor 22, the signalling processor scans on a start-stop basis, the line signalling units are in a group LS1–LSL, the trunk signalling units are in a group TS1–TSL, and the address regenerators are in a group AR—ARL.

Whenever a unit of a group signals the signalling processor, as for example whenever LS1 via path **32*b* signals SP22, SP22** scans that group from the beginning of the group until it finds the signalling unit.

If trunk TS2 signals SP22 via path **84*a*, SP22 starts scanning the group beginning with TS1** until it finds the signalling trunk (TS2 in the present example).

In a similar manner, whenever one of the group such as AR1, ARL signals SP22 as for example if AR1 signals over path AR1*b*, SP22 scans the group until it finds the signalling trunk. It should be noted ARL has the same input and output leads as AR1 (which showing is not included on the drawings to avoid complexity and size of the drawing) and the group should be understood as being so equipped.

Path 21 from the connection processor also signals SP22 and takes priority over any of the other group but waits till a group scan is completed if it is in progress.

Also, when SP22 is engaged by an address regenerator it can respond to and scan a line group or trunk group.

The actual connections through the switching network 40 is controlled by the connection memory 36 which in turn communicates with and is controlled by the connection processor 20. The connection memory 36 keeps communication channels through network 40 in the communication mode until the connection processor advises the connection memory to change them.

The scratch pad memory 52 is shown in more detail in FIGURE 5A and comprises a plurality of scratch pad memories SP1 to SP-last each of which comprises a class memory, a trunk group memory and the scratch pad memory proper having five decimal registers. Each scratch pad memory may comprise other memories not shown. The class memory may be a decimal register, a binary decimal register or a plurality or combination of these whereby the line or trunk over which the called address is received may be categorized in various ways. Thus by means of the class memory, idenftification of the facility over which the call is received may be made as to line or trunk. The trunk group memory enables the identification as to which trunk group contained the trunk over which the call arrived, such as the trunk groups T-, 2T-, . . . LT-, i.e., #1, #2, . . . last. For example, the scratch pad memory SP1 may have the trunk indication in its class memory, trunk group #1 in its trunk group memory and may have the called address 84466 in its registers as shown. As a called address comes into a line signalling unit or a trunk signalling unit, at the end of reception of a digit, the signalling unit signals the signalling processor over a path, such as **32*b*, as a result of which the signalling processor picks up the call for service and receives the digit over a path, such as 32. The signalling processor 22 processes the digit and feeds it into an idle scratch pad memory such as SP1 which it has assigned to the call. Thereupon the signalling processor scans other signalling units. On a subsequent scan, the signalling unit, if it has completed the reception of a digit, again signals the signalling processor over a path, such as 32b, and the next digit is received over a path such as 32 and routed by the signalling processor to the same scratch pad memory SP1, the signalling processor keeping account of the assignment of scratch pad memories by associating a signalling unit code, such as 901, with an asisgned scratch pad memory such as SP1**.

The line and trunk memory 23M is shown in more detail in FIGURE 5B and comprises a plurality of line memories, trunk memories, line signalling memories, and trunk signalling unit memories, each of which comprises a plurality of memories. For example, the local line memory L1 shown in a vertical line comprises direction to memory D, search busy memory SB, cut-through memory CB, lock-out memory L, vacant line memory VL, five decimal A-memory registers, five decimal B-memory registers, a calling office memory comprising two decimal calling office registers, and a tag number memory comprising two decimal tag number registers. A local line, such as line L1, associated with an office, such as office A, has its five digit address recorded in its associated five digit registers in its A-memory as long as the line is associated with the office. For example, line L1 to which end instrument E1 is connected has the address 23614 stored in its A-memory. The trunk memory 1T1 shown in a vertical line has similar memories, but it should be noted that its address recorded in its A-memory comprises a three digit number, such as 101, the first digit "1" of which designates the trunk group and the last two digits "01" of which designate the particular trunk in the group. Also, as shown in FIGURE 5B, each line signalling unit such as LS1 has a B-memory in which is placed a code representative of the line connected thereto through the switching network 40. For example, if line L1 is connected to LS1, the B-memory for LS1 would have therein the digits 701 representative of this line. The 600's–800's may be reserved for local line codes. This local code which employs fewer digits should not be confused with the address 23614. Similarly, each trunk signalling unit such as TS1 has a B-memory in which is placed the code of the trunk connected thereto through the switching network 40. For example, if trunk 1T1 is connected to TS1, the B-memory for TS1 would have therein the digits 101 which is the trunk code for trunk 1T1. The 100's–500's may be reserved for trunk codes. The codes 901–949 may be reserved to designate line signalling units. The codes 950–999 may be reserved to designate trunk signalling units. A line or trunk memory may in computer terminology be called a "word" memory.

The totality of A-memories is designated 24.
The totality of B-memories is designated 56.

Referring mainly to FIGURE 1A but also to FIGURES 2 and 5, in the operation of the saturation signalling network set forth hereinafter, a calling end instrument such as E1 sends a called station address (such as 34721 for E4 as an example) to its central office, such as A for example, where it is placed in the scratch pad memory 52. The central office compares the called address in the scratch pad memory 52 with the addresses in the B-memory portion 56 of the line and trunk memory 23M to determine whether or not a call to the called address is in progress in the central office. If it is not, the central office also compares the called address in the scratch pad memory with the addresses found in the A-memory portion 24 of the line and trunk memory 23M to determine whether or not the called station is connected to central office A.

Assuming that the called address is not found in either the B-memory or the A-memory, the calling office selects an idle trunk (channel), if available, in each outgoing route such as AB or AE which it has to other central offices such as B and E, and repeatedly sends the called address over each of said available outgoing trunks.

It should be observed that with the called address repeatedly sent by the calling office rather than being independently regenerated at tandem offices (1) there is less chance of error; (2) spreading of the call is terminated when the lock-in signal is received; and (3) the tandem offices do not have to request re-transmission in case the address has not been received clearly.

Each time one of these other central offices receives the called address over an incoming trunk it is re-transmitted over an idle trunk, if available, in each route therefrom, except the route over which the address was received, to each central office which is connected thereto. This procedure continues until the destination office is reached.

It is obvious that with a spread of this nature, a collision may occur at a central office between branches of the same call. Furthermore, a collision may occur as the result of two calls from different sources to the same called address. In any collision as illustrated in FIGURE 1B, the last call to arrive at the point of collision loses as indicated by the $x$. Furthermore, if two calls to the same address arrive at the same time at a central office due to a scanning procedure, the first call picked up by the scanner will receive precedence. At least two receptions of the called office code over a given trunk to a central office are received and compared before the central office will allow the called address to remain in the scratch pad memory.

When the call arrives at the destination office such as office P, for example, and the equipment thereat does not detect the called address for station E4 in its B-memories 56 (call-in-progress memories) but does detect the called address in its A memories (memories for local addresses), it repeatedly sends a lock-in signal back over the incoming path to the next preceding office which causes any redundant trunks associated therewith to be released.

This office in turn "cuts-through," allowing the lock-in signal to progress backward to the next preceding office which releases any redundant trunks associated therewith and "cuts-through." Such procedure repeats through the network until the lock-in signal reaches the calling office A over the established path.

The calling office then sends a lock-in signal as the lock-in verification signal over the established path to the terminating office P which terminates transmission of the lock-in signal and signals (rings) the called station. When the called station answers, the terminating office "cuts-through" from the incoming trunk to the called line and communication ensues.

It should be appreciated that if calls to the same destination arrive at a central office over more than one trunk, the automatic release of the trunk or trunks over which the call to the same destination arrives in a central office after the first to arrive, is an important factor in effecting the release of redundant calls in the network and efficient operation of the equipment.

Another important factor in release of redundant paths in the network is achieved by automatically releasing the incoming channel carrying a call to an office whenever each of the outgoing channels carrying the call from the office become released as illustrated in FIGURE 1D, or whenever all outgoing routes are busy as illustrated in FIGURE 1C, or when each outgoing channel is indicated as busy or released as illustrated in FIGURE 1E. It should be appreciated that once a switching center has processed a call and has been unable to send it out in certain directions due to congestion, no further attempts will be made to send the call out on routes initially found to be congested even if these become available while the call is still in the search mode, thus avoiding unnecessary search traffic as the call by this time may be far beyond the given office; and also preventing a call from doubling back from a subsequent office.

Another important factor in release of redundant paths in the network and obviating unnecessary searching as a result thereof is achieved by a central office sending the release signal over incoming and outgoing trunks of the same trunk group when, upon comparing the called address in the Scratch Pad Memory sequentially with the addresses in the B-memories, the central office discovers that the same address is in the B-memory register of a trunk in the same trunk group as the incoming trunk over which the address in the Scratch Pad Memory arrived as indicated in FIGURE 1F. This may be stated in another way as follows: at any time a switchboard receives a call from more than one direction, not only will the secondary incoming branch be rejected by sending release tone, but also no attempt will be made to forward the first branch in the direction from which the secondary branch of the call came. In fact, if the procedure to forward a call in that direction has started it will be interrupted and release in the forward direction will follow on the trunk. This seemingly small modification of the office routing will have a rather significant effect on the call behavior in the network. In case of an unassigned number, the central office of the network will be searched only once.

Another important factor according to the present invention in release of redundant paths in the network (and obviating unnecessary searching as a result thereof) is the provision of means as stated in the objects of the invention whereby a first spreading call path which collides with a second path in the search mode for the same destination will receive a release signal back over the incoming trunk in the first path whereas if the second path is in the cut-through busy mode, having reached the destination, a lock-in signal followed by a release signal will be propagated back over the incoming trunk in the first path.

The first case (collision with call in search mode) assumes that the second call arriving is a branch of the same call and should be released back to the preceding office only, any further release backward taking its course according to circumstances so that searching by the second call can proceed in the network over different paths.

The second case (collision with call in cut-through mode) assumes that the second call is a new call and should be completely cut off as the destination is busy, having already been seized by the first call.

Stated in a different way, if a call, while in the search mode, enters a switching center which is already handling another call to the same addressee in the cut-through mode, it can be decided at that time that any further search for the addressee is superfluous. The procedure to stop the search will be to send a "Lock-in" signal even if the address is not listed as a local number in that particular office. The "Lock-in" signal will be followed immediately by release since a call is already established to the addressee. In the originating office the signal sequence will be interpreted as if the terminating office was found but the addressed terminal was busy.

Relative to a given call, an office will be considered to be in the search mode during the time that a connection is being set up. The search mode begins at the initiation of the call. The end of search mode will depend upon whether the switching center involved is operating as (1) an originating center, or (2) a tandem center, or (3) a terminating center.

In the originating case, the search mode will end after the "Lock-in" signal is received, the verification signal is sent and the "Lock-in" signal ceases, i.e., when the "Lock-in" procedure is completed. The Lock-in procedure effects routines to release all redundant paths. In case of a call to an unassigned number, the cut-through mode will never exist as the search will end when all outgoing trunks are released.

In the tandem case, the search mode will end somewhat earlier since the "Lock-in" signal is not verified in these centers. The search mode is terminated as soon as the "Lock-in" signal is received and the incoming and outgoing trunks are connected together, thus allowing the "Lock-in" signal to propagate towaru the originating office. In all cases the "Lock-in" procedure includes the release of redundant paths.

In the terminating case, the search mode is defined to end after (1) the "Lock-in" signal has been sent, (2) the verification signal has arrived and caused the cut-off of the "Lock-in" signal, and (3) after the cessation of the verification signal.

The cut-through mode starts at the end of the search mode and exists until the connection is released.

An outline of procedures of a call through a central office as affected by conditions of the memories is as follows (This outline assumes that in the case of a local-to-local call, the called address is placed into the B-memory of the calling line memory, and the calling address also is placed into the B-memory of the called line memory):

(1) Scan the line and trunk memories, on each step looking for the called address in the B-memory portion and observing the SB and CB memories.
- (a) If the called address is found in a B-memory,
  - (I) If the call came in over a line—return busy tone to the calling line.
  - (II) If the call came in over a trunk,
    - (A) And the scanned memory is in the SB-mode, stop the scan and return the release signal over the calling trunk.
    - (B) And the scanned memory is in the CB mode, continue the scan; and if a complete scan of the line and trunk memories shows that all the scanned memories having the called address in the B-memories are in the CB-mode, send the Lock-in signal over the calling trunk and after receipt of the Lock-in-Verification signal back over the trunk, send the release signal over the calling trunk.
- (b) If the called address is not found in a B-memory,
  - (I) Scan the line and trunk memories again, on each step looking for the called address in the A-memories and observing the SB and CB memories.
    - (A) If the called address is found in an A-memory, stop the scan; (1) And if the call came in over a line (a) And the scanned memory does not have the SB or CB indication (i.e. is idle), complete the call; (b) And the scanned memory has the SB or CB indication (indicating that the line represented by the called address is engaged in a local-to-local or local-to-trunk call), send busy tone over the called line. (2) And if the call came in over a trunk, return the Lock-in signal over the incoming trunk; (a) And if the scanned memory does not have the SB or CB indication, complete the call; (b) And if the scanned memory has the SB or CB indication, send the release signal over the calling trunk.
    - (B) If the called address is not found in the A-memories upon a complete scan, forward the called address over an idle trunk in each route except the route over which the call came into the office.

While the spread of a call in the detailed illustrations which appear hereinafter is traced from a boundary office to a boundary office, it will be understood that the same principles apply for the spread of a call from a non-boundary office to a boundary office, for the spread of a call from a non-boundary office to a non-boundary office, and for the spread of a call from a boundary office to a non-boundary office.

GENERAL DESCRIPTION OF CALL SPREAD IN THE SYSTEM (From station E1 to station E4 for example)

With this general background of certain principles of saturation signalling, reference is now made to FIGURES 1A and 1G and the manner in which a call may be attempted over a number of paths from a calling station, such as end instrument E1, to a called station, such as end instrument E4. Assuming that end instrument E1 (referred to as station E1) goes "off-hook," to initiate a call to station E4, a scanner in office A detects the off-hook condition, whereupon office A sends dial tone or a start signal to station E1. With the receipt of that tone, station E1 "dials" or sends to office A, the address of station E4, which may be a five digit number unique in the system to station E4.

Office A consults its B-memories to determine whether the address of station E4 is therein (i.e., to see if some other call through office A to station E4 is in progress). We shall assume that the called address is not found therein.

Office A then consults its A-memories (see FIGURE 5) to determine whether or not the called station, as represented by the called address, is associated with (i.e., connected to) office A. If it were, office A would complete the call locally. We shall assume that the called address is not found in the A-memories.

Assuming, as stated above, that no other call through office A is in progress to station E4, office A selects an idle trunk in each of the paths AB and AE and transmits the address of E4 over these trunks to offices B and E respectively. Since the spread of this call and the release of redundant trunks comprises an important feature of the invention, exemplary steps thereof have been set forth in FIGURE 1G along with FIGURE 1A. It will be apparent that the designations of the sixteen offices shown by reduced size circles in FIGURE 1G, and the paths comprising the groups of channels are those represented in FIGURE 1A, the reduced size being provided to simplify the disclosure of one spread pattern which might occur for a given set of conditions.

With reference now to FIGURE 1G, one possible sequence of steps in the spread of a connection from office A toward office P in the establishment of a call from end instrument E1 to end instrument E4, is shown therein and is described as follows:

(1) Office A transmits the call over channels AB and AE to offices B and E respectively.

(2) Office B transmits the call over channels BC and BF to offices C and F respectively. Office E transmits the call over channels EF and EI to offices F and I respectively. The call arrives in office F over channel EF before it arrives over channel BF. The arrival of a call at an office over two different paths is identified hereinafter as a "collison." As a result of the collison, trunk BF, over which the call arrived last at office F, is released. (Actually, as the call over channel EF arrived at office F first, office F may succeed in putting the call in its B-memory and in sending a call over a trunk in the direction of office B before the call from office B gets into the scratch pad memory at office F. When the call from office B gets into the scratch pad memory with the addresses in the B-memory, office F discovers that the called address in the scratch pad memory is the same as the called address in the B-memory of a trunk in the same trunk group as the incoming trunk, the trunks in the same trunk group having the same first digit in their codes. Thereupon Office F sends the release signal over both trunks. Or in accordance with the principle hereinbefore described, it may be that the call from F to B is placed in the scratch pad memory of office B and office B discovers that the trunk in the FB route is in the same trunk group as the outgoing trunk BF which has the same called address registered in the B-memory thereat, whereupon office B sends release signals over trunks FB and BF, releasing both. Timing might be such that both offices B and F send release signals over both trunks, releasing the same. (For details of trunk operation in this patent application refer to U.S. Patent 3,138,668).

(3) The advance of the call thus far with the released paths omitted is shown in this figure for clarity.

(4) Office I sends the call to offices J and M. Office F sends the call to offices J and G but not to B for the reason that once a switching center has received a call over a trunk in a trunk group and that trunk has been released, the switching center will not attempt to forward the same call over a trunk in the same trunk group. Office C sends the call to offices D and G. Trunk FJ is assumed, in this example, to lose in the collison between FJ and IJ. Trunk CG loses in the collision between CG and FG.

(5) The advance of the call thus far with the released paths omitted is shown hereat.

(6) Office M sends the call to office N.
Office J sends the call to offices N and K.
Office G sends the call to offices K and H.
Office D sends the call to office H.

In the present example, channel JN loses in the collision between JN and MN; channel JK loses in the collision between GK and JK; channel GH loses in the collision between GH and DH.

Because all outgoing channels for office J (JK and JN) are released, incoming channel IJ becomes released.

(7) The advance of the call thus far with the released paths omitted is shown.

(8) Office N sends the call to office O.
Office K sends the call to offices O and L.
Office H sends the call to office L.

In this example, it is assumed that trunk KL loses in the collision between KL and HL; and that trunk NO loses in the collision between NO and KO.

Since all outgoing trunks of office N are released (i.e., channel NO), incoming trunk MN for office N becomes released.

In that all outgoing trunks from office M handling the call (i.e., channel MN) are released, incoming trunk IM becomes released.

Because all outgoing trunks from I handling the calls are released, incoming trunk EI becomes released.

(9) Shows the advance of the call thus far with the released paths omitted.

(10) Office O sends the call to office P.
Office L sends the call to office P.

In the given example, trunk LP loses in the collision between LP and OP, due to the scanner picking up the OP call first.

Since all outgoing trunks of office L are released, incoming trunk HL becomes released.

In a smilar manner, trunks DH, CD, BC, and AB become released. As the called address reached office P, office P found this address in its A-memories (because called station E4 is associated therewith) and as a result thereof, office P repeatedly sends the Lock-in signal back over the incoming channel OP.

The Lock-in signal is received in office O which "cuts-through," whereupon the Lock-in signal passes back over trunk KO to office K. Upon receipt of this Lock-in signal, office K releases all outgoing trunks handling the call except the outgoing trunk over which the Lock-in signal was received (i.e., KO). In the present example there were no other remaining outgoing trunks. Office K "cuts-through" and the Lock-in signal progresses backward to office G and in turn F and E to originating office A.

Thereupon, office A sends the Lock-in signal, which constitutes the Lock-in verification signal, forward over the established path to office P. Upon receipt of this verification signal, office P ceases the sending of the Lock-in signal, signals the called station, and sends the "ring-back" signal over the connection to the calling station at office A. When the called station goes off-hook in answering the call signal, office P sends a short burst of "answer signal" over the connection to the calling station and "cuts-through" to the called station. Thereupon communication can ensue.

(11) The established path of the call with the released paths omitted is shown. If the called station is found to be busy as evidenced by its SB or CB register in the A-memory, office P, after having received Lock-in verification, sends the release signal back over the established connections. As all of the previous offices have "cut-through," each of the trunk circuits will receive this signal simultaneously. After having received this signal for the required time period, each of the previous offices will release.

*Call to unassigned number*

In the provision of a saturation signalling network, it is important that no switching center shall process the same call twice in order to prevent "ring-around-the-rosey" switching. As an example, if this were not the case, in the event that an unassigned number were dialled, after a switching center or office discontinues the branch of a call in a given route, it could reinitiate a call to the same address over the route again. This call might be the same call as was previously handled and is now arriving by a different route. According to a novel concept of this invention, the basic principles employed are operative to prevent such manner of operation and in fact to effect release of the call without resorting to the use of time-out equipment. Stated in another manner, a call to an unassigned number will spread through the network passing through a given office only once but will be automatically released as two contending paths meet at an office having no other outgoing paths available therefrom.

Referring again to FIGURE 1G (1–10), an exemplary call made by a station, such as E1, at office A to an "address" (i.e., a five digit number for example) not assigned to any existing station might be traced as shown to office P. Assuming that call OP arrives at office P before call LP, trunk LP becomes released and in turn trunks HL, DH, CD, BC, and AB, as before described.

As no outgoing paths are available from P, the situation of FIGURE 1C essentially obtains, and office P sends the release signal over trunk OP resulting in the release of trunk OP.

Similarly as all outgoing trunks from office O are released, the situation of FIGURE 1D obtains and office O sends the release signal over trunk KO, resulting in the release of trunk KO.

Similarly trunks GK, FG, EF, and AE are released, clearing the call to unassigned number from the system.

PROCESSING OF CALLS IN AUTOMATIC CENTRAL OFFICES

With this background of the manner in which calls may spread through various network patterns, the manner of processing of calls within automatic central offices of the system to effect such manner of operation is now set forth.

It should be understood that, although local-to-local calls are not described in detail, calls of this type are handled by the system and central offices of the disclosure.

First, referring again to FIGURE 1A for illustration, the establishment of a call from station E1 through office A over a trunk in path AE, through office E over a trunk in path EF, through office F to station E3 is now set forth. The call from station E1 through office A to a trunk in path AE is identified as a "local-to-trunk" call. The call from the trunk in path AE through office E to a trunk in path EF is termed a "trunk-to-trunk" call, and the call from the trunk in path EF through office F to station E3 is designated a "trunk-to-local" call.

The switching network in the various central offices as shown in FIGURES 2, 3, and 4 will best be of the fast acting electronic switching type, although the general switching pattern may be reproduced with other forms of equipment.

The switching network may operate on the space division principle and may directly receive and switch voice frequency signals and pulse code modulation signals; or, with proper demodulators and modulators may receive and switch carrier signals. The switching network may also operate on the pulse amplitude modulation time division principle and with proper modulators and demodulators may receive and switch voice frequency signals or carrier signals.

Furthermore, the switching network may operate on the pulse code modulation time division principle, and with proper encoding and decoding may receive and switch voice frequency signals or carrier signals. Also, without encoders and decoders it may directly receive and switch pulse code modulation signals, which may be encoded and decoded by the end instruments.

After the first few usages of certain terms the following abbreviations will be used in the text:

Switching Network=SN
Line Signalling Unit 1=LS1
Trunk Signalling Unit 1=TS1
Signalling Processor=SP
Connection Processor=CP
Connection Memory=CM
Status Memory=SM
Scratch Pad Memory or Memories=SPM
Line and Trunk Memories=LATM
Supervising Signal Generator=SSG

LOCAL-TO-TRUNK CALL (Figure 2)

Referring to FIGURE 2, the manner in which a local-to-trunk call is established through the local office A to a trunk in path AE is now set forth.

(1) As the calling end instrument E1, shown in the upper left corner of FIGURE 2 goes "off-hook," an associated line circuit 12 connected to instrument E1 over paths 10, 11 of line L1 detects such condition and marks an associated conductor 13 to the scanner 18.

(2) The scanner 18 detects the off-hook condition of end instrument E1 by comparing the changed condition of the line L1 (off-hook) detected in its scan with the last registered condition of the line L1 as found in the status memory 17.

(3) The scanner 18 signals the Connection Processor 20 over path 19 of the detection of the off-hook condition of line L1.

(4) CP20 signals the signalling processor 22 over path 21 as to the identity of the off-hook line which was located.

(5) SP22 operates responsively and over path 23 marks the calling line L1 having address 23614 as busy in the line and trunk memory 23M by actuating the search busy register SB associated with line L. (See also FIGURE 5B.)

(6) CP20, which is still engaged by the incoming call, (a) via the scanner selects an idle line signalling unit, such as illustrated line signalling unit LS1, notifying SP22 of the identity thereof over path 21 whereby SP22 stores the calling line code such as 701 in the B-memory of the LS1 memory (see FIGURE 5B);

(b) via path 34, the connection memory 36, path 38, and the switching circuit 40, establishes a connection between the calling line circuit 12 and the assigned line signalling unit LS1 which comprises paths 41 and 43 extending between the IN and OUT portions respectively of the line circuit 12 and the IN and OUT portions respectively of LS1; and (c) disconnects from the call, becomes available to serve another call.

(7) LS1 places a call signal on path 32*b* to SP22.

(8) SP22 in scanning picks up this call signal and (a) connects the IN portion of LS1 over paths 32, 29 and 53 to the scratch pad memory 52. Referring to FIGURE 5A, this may be a connection to an idle scratch pad memory SP1, for example, which SP22 assigns to the call and will be engaged whenever SP22 in its scanning encounters a request for service on path 32*b*; and (b) over path 32*a* signals LS1 to pass the dial tone signal from the DT lead 44 of the supervisory signal generator 42 via the OUT portion of LS1 via path 43 in the switching circuit 40 and the OUT portion of the line circuit 12 to the end instrument or station E1, whereby the station E1 is instructed to start sending the called address.

(9) The station E1 sends the called address of station E3 (84466 in the present example) which is received a digit at a time in the LS1, processed in SP22, and transmitted over paths 29 and 53 for storage in the SP1 portion of SPM52 which accumulates the successive digits of the called address in its memory equipment as shown (see FIGURES 2 and 5).

With reference again the FIGURE 5A, the scratch pad memory contains a plurality of rows of five digit called address memories (or registers) of known structure. The line signalling unit LS1, signalling processor 22 and scratch pad memory 52 combination might be thought of as being operative to provide "register" functions among others, as known in conventional telephone circuitry.

(10) SP22 operates, and (a) upon receipt of the first digit "8" of the called address, signals LS1 over path 32*a* to bar the dial tone a signal received over conductor 44 to terminate transmission out over the connection to end instrument E1;

(b) after receipt of all the digits of the called address, compares the called address 84466 in SPM52 with the addresses found in the B-memories 56 and the A-memories 24. Assuming that another call to the same address is not in progress, the called address will not be found in the B-memories 56. In that the call is not to a local address, the called address will not be found in the A-memories 24;

(c) thereupon SP22

(I) by reference to the line signalling unit memory LS1 (FIGURE 5B) which has the code of the calling line in its B-memory, transmits the called address 84466 over path 23 to the B-memory of line L1 in which it is stored opposite the calling address 23614 for line L1 in the A-memory;

(II) over path 32*a*, signals LS1 to go "off-hook."

(11) LS1 goes "off-hook," marking conductor 30*a* to the scanner 18.

(12) Scanner 18 detects the "off-hook" condition of LS1 by comparing the changed condition of LS1 with the last registered condition of LS1 as found in the status memory 17.

(13) The scanner 18 signals the connection processor over path 19 of the detection of the "off-hook" condition of LS1.

(14) CP20 with the help of the scanner 18 and status memory 17 selects an idle address regenerator, such as AR1, and connects paths 30X and 30Z of LS1 via paths 30*b* and 30*c* of the switching network 40 to paths 62*b* and 62*a* of the "incoming" pair 62*a*–62*b* of AR1. The other pairs 62*c*–62*d*, 62*e*–62*f*, 62*g*–62*h*, 62*i*–62*j* of AR1 are considered "outgoing" pairs.

A signal from LS1 over paths 30X, 30*b* and 62*b* acts as an input to AR1 to mark AR1 that LS1 is connected thereto.

As the connection processor is marked by virtue of the fact that a line signalling unit rather than a trunk signalling unit went "off-hook," the connection processor "knows" that it is appropriate to try to forward the call over each and every route connected to office A. Accordingly CP20 with the help of the scanner 18 and SM17 selects an idle trunk, if available, such as trunk 1T1 in trunk group #1 (AE) and signals the identity (digits 101) of trunk 1T1 over paths 21 to SP22 which via path 23 places the called address 84466 in the B-memory registers associated with the trunk 1T1, and makes trunk 1T1 busy by actuating the search-busy register SB associated therewith.

Also CP20 with the help of the scanner and the status memory selects an idle trunk signalling unit, TS1 for example, with the help of the connection memory 36 and SN40 connects trunk 1T1 with TS1 via paths 66 and 68, and also connects paths TS1X and TS1Z of TS1 over paths 66*a* and 66*b* with an "outgoing" pair of paths 62*d* and 62*c* of address regenerator AR1, whereupon a signal from TS1 over paths TS1Z, 66*b* and 62*c* acts as an input to AR1 to mark AR1 that TS1 is connected thereto. CP20 also signals the identity of TS1 to SP22 over path 21.

(a) SP22 causes the identity of trunk 1T1 (i.e., 101) to be registered in the B-memory portion of the TS1 memory (see FIGURE 5) and via path 80 signals TS1 to pass the seize signal on lead 50 from the supervisory signal generator 42 over the OUT portion of TS1, path 68, and the OUT portion of trunk 1T1 over trunk 1T1.

Similarly, CP20 effects the connection of an idle trunk, such as 2T1, to an idle trunk signalling unit, such as TS2, over paths 70 and 72, and the connection of paths TS2*x* and TS2*z* of TS2 over paths 70*a* and 70*b* to an "outgoing" pair of paths 62*f* and 62*e* respectively of AR1, whereby a signal from TS2 over paths TS2*z*, 70*b* and 62*e* acts as another input signal to AR1 marking AR1 that a trunk signalling unit, such as TS2, is connected thereto. SP22 causes the identity of trunk 2T1 (201) to be registered in the B-memory portion of the TS2 memory (see FIGURE 5).

Similarly, if there were another trunk group, such as trunk group #3 outgoing from office A, CP22 effects the connection of an idle trunk, such as LT1 to an idle trunk signalling unit, such as TSL, over paths 74 and 76 and the connection of paths TSLX and TSLZ of TSL over paths 74*a* and 74*b* to the "outgoing" pair of paths 62*h* and 62*g* respectively of AR1, whereby a signal over paths TSLZ, 74*b* and 62*g* acts as another input signal to AR1 to mark AR1 that TSL is connected thereto. The identity of the trunk LT1 (i.e., LO1) is placed in the TSL memory (see FIGURE 5).

CP20 "knows" when the last "outgoing" trunk group from office A has been served and at this time signals the identity of line signalling unit LS1 and AR1 to SP22 which:

(a) Holds path 29 open and connects path 61 whereby the called address passes from the scratch pad memory to the register-sender 62*p* of AR1 and is stored therein. This path may be traced from SPM52 over paths 51, 61, AR1*a*, to 62*p*. Thereupon 62*p* places the called address signals simultaneously and repeatedly on paths 62*d*, 62*f*, 62*h* and 62*j*.

(b) Disconnects path 61.

(c) Resumes its scanning and becomes available to CP over path 21.

(d) Signals CP20 over path 26.

CP20 in response thereto becomes available to handle another call over path 19.

(15) As the seize acknowledge signal is received over a particular trunk, such as 1T1, the connected trunk signalling unit, such as TS1, ceases sending the seize signal. When the trunk signalling unit, such as TS1, detects that the seize acknowledge signal has ceased, it passes the called address out over the trunk. Similarly for each outgoing trunk.

Accordingly, the register-sender 62*p* repeatedly sends the called address 84466 out over the outgoing trunks as follows:

Over trunk 1T1 in route AE over path 62*d*, 66*a*, TS1X, the OUT portion of TS1, path 68, and the OUT portion of trunk 1T1, and out over trunk 1T1;

Over trunk 2T1 in route AB over path 62*f*, 70*a*, TS2X, the OUT portion of TS2, path 72, the OUT portion of trunk 2T1, and out over trunk 2T1;

Over trunk LT1 in another route if it existed from office A over path 62*h*, 74*a*, TSLX, the OUT portion of TSL, path 76, the OUT portion of trunk LT1, and out over trunk LT1.

(16) Thereupon:
- (a) LS1 monitors the calling circuit, such as line circuit 12 of line L1, in the present example, for disconnect; and
- (b) The called trunks, such as 1T1, 2T1, and LT1 are monitored via the trunk signalling units, such as TS1, TS2, and TSL respectively for the Lock-in signal or the release signal.

(17) Assuming that the Lock-in signal is received over the trunk 1T1, this signal is received over the IN portion thereof and passes over path 66 to TS1. TS1, in turn, sends a coded signal over path 80*a* to SP22 which marks SP22 as to the identity of TS1 and as to the fact that TS1 has received the Lock-in signal.

(18) SP22 picks up this signal as it scans the units connected thereto on the left and responds by signalling back to TS1 over path 80.

(19) In response thereto, TS1 signals AR1 over paths TS1Z, 66*b*, and 62*c*, that it has received the lock-in signal.

(20) AR1 in response thereto:
- (a) Disconnects register-sender 62*p* from paths 62*d*, 62*f*, 62*h*, and 62*j* and erases the called address from 62*p*, thus stopping the spread of the call;
- (b) Remembers over which "outgoing" pair knowledge of the Lock-in signal was received, i.e., pair 62–62*d*; and
- (c) Places a signal on path AR1*b*, identifying itself to SP22.

(21) SP22 picks up this signal as it scans and responds thereto by sending a coded signal over path AR1*c* which marks AR1 to request the incoming signal unit to identify itself.

(22) AR1 over paths 62*b*, 30*b*, and 30*x* requests LS1 to identify itself to the signalling processor.

(23) LS1 places a signal on lead 32*b* identifying itself to SP22 as SP22 scans this lead, thus enabling SP22 to "know" that the "incoming" signal unit represents a line rather than a trunk and thus to "know" that the call is a local-to-trunk call requiring Lock-in verification. Although SP22 has been scanning, it has maintained connections to AR1.

(24) In response thereto SP22 in its scanning procedure:
- (a) Sends a coded signal over path 80 to TS1 as it encounters path 80 in its scanning, marking TS1 to pass the lock-in verification signal over the trunk connected thereto.
  - (1) TS1 in response thereto completes a path for the lock-in signal, which constitutes the lock-in verification signal, from supervisory signal generator 42 over path 48, via TS1, path 68 and circuit 14 out over trunk 1T1.
- (b) Sends a coded signal over path AR1*c* to AR1 as it encounters path AR1*c* in its scanning, marking AR1 to request all other signalling units connected to AR1 and associated with outgoing trunks besides TS1, over which the Lock-in signal was received to identify themselves to SP22.

(25) AR1 "remembering" that the Lock-in signal was received over the trunk connected to pair 62*c*–62*d*, does not at this time signal TS1 to identify itself to SP22 but:
- (a) Sends a coded signal over path 62*f*, 70*a*, and TS2*x* to TS2, advising TS2 to identify itself to SP22; and
- (b) Sends a coded signal over path 62*h*, 74*a*, and TSL*x* to TSL, advising TSL to identify itself to SP22.

(26) TS2 identifies itself over path 82; and TSL identifies itself over path 84'*a*.

(27) SP22 in its scanning procedure picks up one identity 82 and in response thereto:
- (a) Sends a coded signal over path 84 to TS2, marking TS2 to pass the release signal out over the trunk.
  - (I) TS2 passes the release signal from SSG42 over path 46, through TS2, path 72, trunk circuit 14A, out over trunk 2T1.
- (b) Sends a coded signal over path 26, marking CP20 to disconnect TS2 from AR1. This coded signal includes digits identifying TS2.
  - (I) CP20 by consulting CM36 finds out what address regenerator, i.e., AR1, is connected to TS2; and, via 36, 38, and 40 disconnects paths 70*a* and 70*b*.

(28) SP22 in its scanning procedure also picks up the identity 82' and in response thereto:
- (a) Sends a coded signal over path 84' to TSL, marking TSL to pass the release signal.
  - (I) TSL passes the release signal from SSG42 over path 46, through TSL, path 76, trunk circuit 14B, out over trunk LT1.
- (b) Sends a coded signal over path 26, marking CP20 to disconnect TSL from AR1. This coded signal includes digits identifying trunk LT1.
  - (I) CP20 by consulting CM36 finds out what address regenerator, i.e. AR1, is connected to TSL; and via 36, 38, and 40 disconnects paths 74*a* and 74*b*.

(29) As SP22 "knows" when it has picked up all identities of outgoing trunks associated with the call by completion of a scanning cycle, it:
- (a) Sends a coded signal over path 26 to CP20, marking CP20 to become available to new calls.
  - (I) CP20 becomes available to a new call from the scanner over path 19.
- (b) Marks itself to become available to a new call over path 21.

Thereupon, trunks TS1, TS2, and TSL are "on-their-own" awaiting signals or indications back over the trunks. These signals or indications may come back in any order. Only LS1 and TS1 are connected to AR1 at this time.

(30) When the Lock-in signal over trunk 1T1 ceases, TS1 signals this fact over path 80*a* to SC22.
- (a) In response SC22 signals TS1 over path 80 to cease passing the Lock-in verification signal. In response thereto TS1:
  - (I) Ceases passing the Lock-in verification signal.
  - (II) Signals AR1 over paths TS1*z*, 66*b*, and 62*c* to identify itself to SP22.
- (b) AR1 places a signal on path AR1*b*, identifying itself to SP22.
- (c) SP22 sends a coded signal over path AR1*c* to AR1 to request the incoming signalling unit to identify itself.
- (d) AR1 sends a coded signal over paths 62*b*, 30*b*, and 30x to LS1 requesting LS1 to identify itself to SP22.

(e) LS1 places a coded signal on path 32b, identifying itself to SP22 as SP22 scans.

(f) In response thereto, SP22 places coded signals on path 26 to CP20, giving CP20 the identity of LS1 and TS1; requesting CP20 to find the identity of the line circuit and trunk circuit respectively connected thereto; to disconnect paths between the incoming line signalling unit LS1 and AR1; to disconnect paths between the locked-in trunk signalling unit TS1 and AR1; and to interconnect the incoming line and locked-in trunk.

(I) CP20 with the help of 36 and 40 executes these commands and signals over path 21 to SC22 that this has been done.

(A) SC22 in response thereto changes the L1 and 1T1 memory units from search busy (SB) to cut-through busy (CB).

(B) SP22 removes the line and trunk codes from the B-memory portion of the LS1 and TS1 memories (see FIGURE 5).

(C) SP22 makes itself available to another call over path 21.

(D) SP22 signals CP20 over path 26 which makes itself (CP20) available to another call over path 19.

When LS1 and TS1 become disconnected from AR1 as the marker disrupts connections 30b, 30c, 66a, and 66b, AR1 having all connections to lines and trunks disrupted, places the idle signal on path 62w to the scanner, making itself available for use in handling another call. Communication now takes place over paths 86 and 88.

(31) If trunk 2T1 next receives the release signal back over the trunk, constituting the release verification signal, TS2 in response thereto ceases passing the release signal. As a result of the stoppage of the release signal, the distant end ceases sending the release verification signal. In response to the cessation of the release verification signal TS2 places a coded signal to this effect on path 84a.

(a) As a result of picking up this signal in its scanning procedure SP22:

(I) Removes the search busy (SB) indication from the 2T1 memory (see FIGURE 5).

(II) Erases the called address 84466 from the B-memory registers of the 2T1 memory (see FIGURE 5).

(III) Erases the trunk 2T1 code from the TS2 memory.

(IV) Signals CP20 over path 26 to disconnect 14A from TS2.

(A) CP20 with the help of 36 and 40 disconnects 14A from TS2, which place the idle signal on paths 91a and TS2a to the scanner 18.

(32) When trunk LT1 receives the release signal over the trunk as the release verification signal, a similar procedure effects the release of LT1, 14B, and TSL and adjustment of the memories.

In brief summary, it will be seen that with the dialling at end instrument E1 at office A of the called address, such as 84466, representative of an end instrument E3 at office F, the equipment will automatically extend or spread the connection over the outgoing paths, such as AB and AE, of office A to offices B and E respectively. The call will be further spread by such offices and, at such time as a Lock-in signal is received indicating the arrival of the call at the terminating office, the equipment will be operative to release the ones of the path which did not include the lock-in signal, and to establish a connection over the path and trunk over which the lock-in signal was received.

Operation of the equipment to release outgoing trunks from an office used in a call spread except the trunk over which the Lock-in signal was received is in accordance with the operation set forth in the patent and patent application identified hereinbefore.

*Release of equipment responsive to restoration of calling line first (local-to-trunk call)*

The manner in which the equipment is released in the event the calling line releases first is now set forth hereat.

(1) As a calling line, such as L1 releases, the scanner 18 detects the release, and over path 19 notifies CP20 of the release.

(2) CP20 via CM36 and SN40, (a) Effects disconnect of the calling line circuit 12, associated with line L1, from the called trunk circuit 14 associated with trunk 1T1, by interrupting the connection extending over paths 86, 88;

(b) Connects the release conductor 93 to path 142 of the trunk circuit 1T1 which was used in the call, whereby the release signal is repeatedly sent out over trunk 1T1;

(c) Signals the signalling processor 22 over path 21 indicating that such operation has been effected.

SP22 removes the cut-through busy indication for the calling line L1 from its memory, whereby the line will appear as idle to office A. Also SP22 removes the called address from the L1 B-memory.

(3) When the equipment of the distant end of the trunk 1T1 releases, the trunk circuit 14 associated with the trunk 1T1 marks path 91 to provide a release marking to the scanner 18 as the release verification signal.

(4) Scanner 18 operates to compare the release verification signal with the status of the trunk as marked in the status memory 17, and in such comparison detects the existence of the release verification signal on path 91. Scanner 18 over path 19 notifies CP20 of the detection of such signal.

(5) CP20 through CM36, controls SN40 to effect disconnection of the release conductor 93 from path 142 of trunk circuit 14 associated with trunk 1T1.

(6) When the release verification signal ceases, scanner 18 notifies CP20 which notifies SP22.

(7) SP22 in response thereto over path 23 removes the marking from the "cut-through" busy register for trunk 1T1 and removes the called address from its memory, whereby the trunk will appear as idle to office A.

*Release of equipment responsive to release of trunk first (local-to-trunk call)*

(1) In the event that the outgoing trunk 1T1 used in the call receives the release signal before the calling party restores, trunk circuit 14 places a signal on path 91 indicating that the release signal has been received and scanner 18

(a) Signals CP20 over path 19 of such release signal reception.

(2) CP20 in response to such signal is operative with CM36 and SN40 to (a) Disconnect the calling line circuit 12 associated with calling line L1, in the present example, from the called trunk circuit 14 associated with trunk 1T1, in the present example, by interrupting the paths extending over 86, 88 therebetween;

(b) Connects the calling line circuit 12 for line L1 over SN40 to the busy conductor 95 associated with SSG42 whereby line L1 receives busy tone;

(c) Connects path 14Z of the trunk circuit for trunk 1T1 to the release conductor 93 associated with SSG42 whereby the release signal passes over the OUT-portion of trunk circuit associated with trunk 1T1 and path 16 out over trunk 1T1 as the release verification signal to the trunk equipment at the other end of the connection;

(d) Over path 21 signals the signalling processor 22 of such disconnection and of the transmission of the release verification signal over trunk 1T1.

(3) SP22 in response thereto controls erasure of the called address (84466 in the present example) from the trunk 1T1 portion of the B-memory register 56 over path 23.
(4) When the release signal from office A over trunk 1T1 ceases, trunk circuit 14 places a signal on path 91 to the scanner which picks up this release, checks the status memory and notifies CP20.
(5) CP20 in response:
  (a) Via CM36 and SN40 disconnects path 14Z from path 93;
  (b) Notifies SP22 which effects removal over path 23 of the cut-through busy from the 1T1 trunk memory corresponding to trunk 1T1 which was used in the call, to thereby indicate the trunk as idle to office A.
(6) When the calling line L1 goes "on hook" the scanner 18 in its scanning operation, detects the on-hook condition in the manner described hereinbefore, and over path 19 notifies CP20 of such condition.
(7) CP20 responsively operates and
  (a) Effects interruption of SN40 connection from the calling line circuit 14 for line L1 to the busy lead 95;
  (b) Over path 21 notifies SP22 of such operation.
(8) SP22 over path 23 responsively removes the marking on the cut-through busy register in the L1 memory associated with the calling line L1.

*Call to same address found in progress (collision) (local-to-trunk call)*

In the foregoing example, the manner of operation of the switching equipment in spreading a call from a local station over a plurality of outgoing trunks was set forth in detail. As indicated, during the progress of the call, the equipment was operative to check the B memories 56 of the equipment in the calling office A for the purpose of determining if there was another call to the same called address (84466) in progress at the time. In the example set forth above, it was assumed that there was no other call registered in the B memories 56 to the same called address 84466 and accordingly the processing of the call continued in accordance with the established pattern.

It is now assumed, for purposes of explanation, that another call through office A is in progress to the same called address 84466. As noted above, in such event the called address in the present example will be in one or more of the register sets in the B memories 56 and will be found by SP22.

(1) As a result of the detection of the same address in the B memories 56, SP22,
  (a) Effects interruption of the connection 29 between LS1 and the input path 53 to SPM 52 and over path 53 erases the called address 84466 from register SP1 in the SPM52;
  (b) Erases the line L1 code from the LS1 memory (see FIGURE 15); and
  (c) Over path 26 notifies the marker 20 of such operation.
(2) CP20 is operative
  (a) With CM36 to control SN40 to interrupt the paths 41, 43 which extend between the line circuit 12 for line L1 and LS1;
  (b) To connect line circuit 12 to the busy conductor 95 of SSG42.
(3) As the calling line L1 goes "on-hook," path 13 to scanner 18 is marked, and the scanner 18 detects such release and over path 19 notifies CP20 of such release.
(4) CP20 operates responsively and
  (a) With CM36, controls SN40 to interrupt the connection over SN40 between the line circuit 12 for line L1 and the busy conductor 95;
  (b) Over path 21 notifies SP22 of termination of the busy signal transmission.
(5) SP22 over conductor 23 responsively removes the marking from the search-busy register SB for the calling line L1 in the A memories 24, whereby the line L1 now appears idle to office A.

*All outgoing trunks busy (local-to-trunk call)*

In the example set forth hereinbefore in which a call initiated by the end instrument E1 at office A was spread over outgoing trunks, such as AE, AB, to other offices in the system in the search for the desired end instrument E3 having address 84466, it was assumed that an idle trunk was available for spreading the call in such manner.

It is now assumed that each of the outgoing trunks in the various routes at office A is busy, and the following description sets forth the manner in which the equipment operates in response to the detection of the busy condition.

(1) In the tracing of the call in the example set forth hereinbefore, it will be recalled that SP22 over path 23 placed the called address (84466 in the present example) in the B memories of line L1 opposite the calling address (23614 in the present example) in the L1 column, and CP20 with the help of the scanner 18 and status memory 17 searched for an idle trunk in each route from office A finding idle trunks 1T1, 2T1, and LT1.

However, if it is impossible to find an idle trunk from office A, the CP20 notifies SP22, which
  (a) Effects interruption of the connection 29 between LS1 and the input path 53 to the SPM52;
  (b) Erases the called address (84466 in the present example) from the register SP1 in the scratch pad memory, and also from the B-memory portion of the L1 memory;
  (c) Erases the L1 code from the LS1 memory; and
  (d) Notifies the CP20 over path 26 of such operation.
(2) The sequence of operation of the system thereafter would be understood from what has gone before.

This condition is more simply expressed in the showing of FIGURE 1C in which the legends and the arrows thereshown indicate the manner in which, with all outgoing paths busy, the incoming path is released.

*Release by calling line prior to return of lock-in or release signal over outgoing trunk (local-to-trunk call)*

In the description of the call that was being spread from station E1 to station E3 or E4 above, the example was given of the operation of the system responsive to the receipt of a Lock-in signal over a trunk (1T1 in such example).

(1) In the event that the calling line releases before the lock-in signal is received or before a release signal is received back over any outgoing trunk, LS1 signals SP22 over path 32*b*.
(2) SP22 in response:
  (a) Erases the called address from the L1 memory;
  (b) Over path 32*a* signals LS1 to request the connected address regenerator to stop sending the called address and identify itself.
(3) LS1 over paths 30*z*, 30*c*, and 62*a* requests AR1 to stop sending and identify itself to SP22.
(4) AR1 erases 62*p* and over path AR1*b* identifies itself to SP22.
(5) SP22 over path AR1*c* requests AR1 to have the trunks connected to the "outgoing" pairs identify themselves.
(6) AR1 in response:
  (a) Over paths 62*b*, 62*d*, 62*f* and 62*h* and connected paths of the switching network signals TS1, TS2, and TSL to identify themselves to SP22.
    (I) TS1, TS2, and TSL identify themselves over paths 80*a*, 84*a*, and 84'*a* respectively.
  (b) Over path AR1*b* signals SP22 that this has been done.
(7) SP22 in response scans line and trunk signalling units.
  (a) Again SP22 responds to a signal on path 32*b* from LS1 and in response thereto signals CP20 over path 26 to disconnect LS1 completely.
(I) CP20 in response:
(A) With the help of CM36 and SN40 disconnects paths 41, 43, 30*b*, and 30*c*.
(1) Line circuit 12 places the idle signal on path 13 to scanner 18.
(B) Over path 21 notifies SP22. (1) SP22 in response (a) Removes the SB busy from the L1 memory; (b) Removes the line code 701 from the TS1 memory.
(b) When SP22 picks up the signal on path 80*a* from TS1, SP22 over path 26 signals CP20 to disconnect paths TS1*x* and TS1*z*.
(I) CP20 in response
(A) Effects this disconnection and
(B) Reports back to SP22 over path 21. (1) SP22 over path 80 signals TS1 to pass the release signal out over the connected trunk.
(c) When SP22 picks up the signal on path 84*a* from TS2, in similar fashion, paths TS2*x* and TS2*z* become disconnected and TS2 passes the release signal out over trunk 2T1.
(d) When SP22 picks up the signal on path 84'*a* from TSL, in similar fashion, paths TSL*x* and TSL*z* become disconnected and TSL passes the release signal out over trunk LT1.
(I) With AR1 disconnected from line and trunk signalling units, AR1 places the idle signal on path 62*w* to the scanner.
(8) As the release verification signal is received back over a trunk, such as 1T1, the trunk signalling unit, such as TS1 ceases passing the release signal. When the release verification signal ceases, TS1 signals SP22.
(a) SP22 in response:
(I) Erases the called address from the 1T1 memory.
(II) Signals CP20 which effects the disconnection of 1T1 from TS1 and signals SP22.
(A) SP22 erases the trunk code of 1T1 (i.e., 101) from the TS1 memory.
(9) Similarly for trunk 2T1 and LT1 as the release verification signal is received.

*Operation of equipment at an office with failure of a lock-in signal and responsive to receipt of a release signal over all outgoing paths (Figure 1D) (local-to-trunk call)*

In the example in which the spreading of a call from the station E1 over the system for the station E3 as described earlier herein, the operation of the system in response to a Lock-in signal was set forth in detail. At this time, the description sets forth the manner of operation in the event that no Lock-in signal is received, and a release signal is received over each of the outgoing trunks. The resultant operation is represented in the basic schematic showing of FIGURE 1D.

In order to simplify the description, reference is made first to the operation of the system as the release signal is received over one of the trunks, and thereafter the manner in which the system is operative as the release signal has been received over all of the outgoing trunks.

Assuming now that the release signal is received over the trunk 1T1, trunk signalling unit TS1 connected thereto, detects the release signal over path 66 and in turn notifies SP22 over path 80*a*.

(1) SP22 is responsively operative to
(a) Notify CP20 over path 26; and
(b) Over path 23 to erase the called address from the B-memory of trunk 1T1.
(2) CP 20 via CM36 controls SN40 to effect disconnection of TS1 from AR1, and notifies SP20 of such disconnection.
(a) SP20 via path 80 signals TS1 to pass the release signal from path 46 out over trunk 1T1 as the release verification signal. SP20 and CP20 become free to handle another call.

(3) Upon termination of the release signal from the distant end, TS1 over path 80*a* notifies SP22, which:
(a) Over path 80 notifies TS1 to cease passing the release signal from conductor 46; and
(b) Over path 26 notifies CP20.
(4) CP20
(a) With help of CM36, and SN40 disconnects TS1 from 14 by interrupting paths 66, 68; and
(b) notifies SP22 over path 21.
(5) SP22 is operative thereupon to remove the search busy marking and the called address from the trunk memory and 1T1, and the 1T1 code 101 from the TS1 memory, making the trunk available for use in another call.
(6) Assuming now that the release signal is received over all trunks associated with the call, the trunks and the associated trunk signalling units will be released individually, as explained above.
(7) When the last trunk associated with the various groups of trunks has been released, all of the connections to the "outgoing" circuits of AR1 will have been removed whereby AR1 is enabled to place a signal on path AR1*b* to SP22 indicating to SP22 that a release signal has been received over each outgoing trunk associated with the call.
(8) SP22 in response thereto:
(a) Places coded signals on path AR1*c*, marking AR1 to have the signalling unit connected to the "incoming" pair identify itself.
(9) AR1 places a signal on path 62*b* advising LS1 to identify itself.
(a) LS1 places a signal on path 32*b*, identifying itself to SP22.
(10) SP22 in response:
(a) Checks the LS1 memory to find that line L1 is connected to LS1.
(b) Over path 23 erases the called address 84466 from the B-memories of L1 as located opposite the calling address, 23614 in the present example, for line L1.
(c) Notifies CP20 over path 26, giving CP20 the identity of LS1 and AR1.
(11) CP20 responds thereto and:
(a) With the help of CM36 and SN40:
(I) Disconnects line circuit 12 from LS1.
(II) Disconnects LS1 from AR1
(A) AR1 thereupon, having all its input and output pairs disconnected, places the idle signal on path 62*w* to scanner 18, making itself available to handle another call.
(b) Connects path 12*z* of the line circuit 12 of the calling line L1 to busy conductor 95.
(c) Signals SP22.
(I) SP22 erases the code of L1 from the LS1 memory.
(12) When the calling line releases, the marking on path 13 is detected by scanner 18 in its normal scan, and scanner 18 over path 19 notifies CP20 of the release.
(13) CP20 responsively,
(a) With the help of CM36 and SN40 disconnects the line circuit 12 for the calling line L1 from the busy lead 95; and
(b) notifies SP22 over conductor 21 of the disconnect.
(14) SP22 over path 23 removes the busy marking from the search busy register SB in the calling line memory.

TRUNK-TO-TRUNK CALL

(FIGURE 3)

In the exemplary call described hereinbefore in which a call from an instrument E1 at office A for an instrument E3 in office F was spread over the system, the procedures involved in extending the call over trunk 1T1 in path AE, and trunk 2T1 in path AB were set forth. In describing such operation, reference was made to the return of certain signals from the distant equipment in the event certain conditions existed at the distant offices. The following description now sets forth the manner in which the equipment at a distant office, such as office E, is operative responsive to the signals received over a trunk, such as 1T1 in path AE, from office A. In other words, the call over outgoing trunk 1T1 of FIGURE 2, may be considered as incoming to FIGURE 3 over trunk 1T1 of FIGURE 3.

In that the equipment at the offices A, E, etc., are similar in general, numerals in FIGURE 3 are similar to those used in FIGURE 2 for like equipment.

(1) As the seize signal is received over path 15 of incoming trunk 1T1 (FIGURE 3) in path AE which extends from office A (FIGURE 2) to Office E (FIGURE 3), the trunk circuit 14 for trunk 1T1 effects marking of conductor 91 to the scanner 18 at office E.
(2) Scanner 18 detects the seized condition of trunk 1T1.
(3) Scanner 18 signals CP20 over path 19 of the detection of the seized condition of trunk 1T1.
(4) CP20 signals SP22 over path 21 as to identity of the seized trunk which was picked up in the scanning process.
(5) SP22 operates responsively and over path 23 marks the calling trunk as busy in its trunk memory (see FIGURE 5) by actuating the search busy register SB associated with trunk 1T1.
(6) CP20 which is still engaged by the incoming call,
  (a) via the scanner 18 selects an idle trunk signalling unit, such TS1, notifying SP22 of the identity thereof over path 21, whereby SP22 stores the calling trunk code 101 in the B-memory of the TS1 memory (see FIGURE 5).
  (b) via path 34, CM36, path 38, and SN40, establishes a connection over paths 66 and 68 between the calling trunk circuit 1T1 and the assigned trunk signalling unit TS1; and
  (c) disconnects from the call, becoming available to serve another call.
(7) TS1 over path 80*a* signals SP22.
(8) SP22 responds and
  (a) Connects the IN portion of TS1 over paths 78, 93, and 53 to SPM52.
  (b) Over path 80 signals TS1 to pass the seize signal from the seizure path 50 of SSG42 via the OUT portion of TS1 via path 68 in the SN40, path 14Z, and the OUT portion of trunk circuit 1T1 out over path 16 of the trunk 1T1 of path AE to the office A, which signal in effect operates as the seize acknowledge signal to office A.
(9) At office A, the seize acknowledge signal effects operation of the address regenerator, such as AR1, connected for use in the call to forward the called address 84466 over the trunk 1T1 in path AE to office E (such operation at office A having been described hereinbefore), the address being transmitted one digit at a time (which may be in bit form, if desired).

The called address is received over path 15 of trunk 1T1 and extended over trunk 1T1 and path 66 to TS1 from where it is passed a digit at a time over path 78 to SP22 for processing therein. SP22 forwards the called address over path 53 to SPM52 which accumulates the called address in the registers of an idle call address memory, such as SP1.

(10) After the complete called address is in SP1 of SPM52, SP22 controls comparison of the called address 84466 in SPM 52, with the addresses registered in the B-memories 56 and the A-memories 24. Assuming that another call to the same address is not in progress the called address will not be found in the B-memories 56. In that the station E3 having the called address 84466 is in office F, it will be apparent that the address will not be found in the A-memories of office E, and as a result SP22 determines that the call is to be extended to an outgoing trunk and not to a local station.

SP22 therefore places the called address in the B-memory of trunk 1T1 which is opposite the address 124 of the calling trunk 1T1 in its A-memory.

SP22 also, by virtue of the fact that it "knows" that the call is a trunk-to-trunk call, signals TS1 over path 80 to go off-hook.

(11) TS1 goes "off-hook," marking conductor TS1*a* to the scanner 18.
(12) Scanner 18 detects the "off-hook" condition of TS1.
(13) Scanner 18 signals CP20 over path 19 of the detection of the "off-hook" condition of TS1.
(14) CP20 with the help of scanner 18 and SM17 selects an idle address regenerator, such as AR1, and connects paths 66*a* and 66*b* of TS1 via SN40 to paths 62*b* and 62*a* respectively of "incoming" pair 62*b*–62*a* of AR1.

A signal for TS1 over paths 66*a* and 62*b* acts as an input to AR1 that a trunk signalling unit is connected to its "incoming" pair.

As CP20 is marked by virtue of the fact that a trunk signalling unit rather than a line signalling unit went "off-hook" and particularly that trunk 1T1 of trunk group #1 (AE) went off-hook, CP20 "knows" that it is appropriate to try to forward the call over each and every route connected to office E except the route containing the incoming trunk 1T1. Accordingly, CP20 with the help of the scanner and SM17 selects an idle trunk, if available, such as trunk 2T1, in trunk group #2 (EF) and signals the identity of trunk 2T1 to SP22 which via path 23 places the called address 84466 in the B-memory associated with the trunk 2T1, and makes trunk 2T1 busy by actuating the search-busy register SB associated with trunk 2T1.

Also, CP20 with the help of the scanner and the status memory selects an idle trunk signalling unit,, TS2 for example, and, with the help of CM36 and SN40 connects trunk 2T1 with TS2 via paths 70 and 72 and also connects paths TS2*x* and TS2*z* of TS2 over paths 70*a* and 70*b* with an "outgoing" pair of paths 62*d* and 62*c* of address regenerator AR1, whereupon a signal from TS2 over paths TS2*z*, 70*b* and 62*c* acts as an input to AR1 to mark AR1 that TS1 is connected thereto. CP20 also signals the identity of TS2 to SP22 over path 21.

(a) SP22 places the trunk code 201 of trunk 2T1 in the TS2 memory.
  (b) SP22 via path 84 signals TS2 to pass the seize signal on lead 50 out over trunk 2T1.

Similarly, CP20 effects the connection of an idle trunk, such as LT1, of group EI to an idle trunk signalling unit, such as TSL, over paths 74 and 76, and the connection of paths TSL*x* and TSL*z* of TSL over paths 74*a* and 74*b* to an "outgoing" pair of paths 62*f* and 62*e* respectively of AR1, whereby a signal from TSL over paths TSL*z*, 74*a* and 62*e* acts as a second input signal to AR1, marking AR1 that a trunk signalling unit, such as TSL is connected thereto. The memories are marked as would be understood.

CP20 knows when the last "outgoing" trunk group from office E has been served and at this time signals the identity of TS1 and AR1 to SP22 which:

(a) Holds path 93 open and signals AR1 over path AR1*c* to interconnect path 62*a* with paths 62*d*, 62*f*, 62*h* and 62*j*. These paths contain impedance matching devices and pulse repeaters.
  (b) Resumes its scanning and becomes available to CP over path 21.
  (c) Signals CP20 over path 26.

CP20 in response thereto becomes available to handle another call over path 19.

(15) As the seize acknowledge signal is received over a particular trunk, such as 2T1, the connected trunk signalling unit, such as TS2, ceases sending the seize signal. When the trunk signalling unit, such as TS2, detects that the seize acknowledge signal has ceased, it passes the called address out over the trunk. Each outgoing trunk operates in a similar manner.

Thus, the calling address is repeatedly forwarded from the calling trunk 1T1 to the outgoing trunks 2T1 and LT1.

The connection from trunk 1T1 to trunk 2T1 for example can be traced as follows: from path 15 of trunk 1T1, trunk circuit 14, path 14*x*, path 66, the IN portion of TS1, path TS1*z*, path 66*b*, path 62*a*, AR1, path 62*d*, path 70*a*, path TS2*x*, TS2, the OUT portion of TS2, path 72, path 14A*z*, the OUT portion of trunk circuit 14A and path 16*a* out over trunk 2T1.

(16) While the called address is being forwarded over the outgoing trunks 2T1 and LT1, the trunk signalling unit TS1 monitors the calling trunk 1T1 for the release signal; and the trunk signalling units TS2 and TSL monitor the called trunks 2T1 and LT1 for the Lock-in signal or the release signal.

(17) Assuming that the Lock-in signal is received next over trunk 2T1, this signal is received over path 15*a* thereof and passes over 14A and paths 14A*x* and 70 to TS2. TS2, in turn sends a coded signal over path 84*a* to SP22 which marks SP22 as to the identity of TS2 and as to the fact that TS2 has received the Lock-in signal.

(18) SP22 picks up this signal as it scans the units connected thereto on the left and responds by signalling back to TS2 over path 84.

(19) In response thereto, TS2 signals AR1 over paths TS2*z*, 70*b* and 62*c* that it has received the Lock-in signal.

(20) AR1 in response thereto:
  (a) Disconnects path 62*a* from paths 62*d*, 62*f*, 62*h*, and 62*j*, thus stopping spread of the call;
  (b) Remembers over which "outgoing" pair knowledge of the Lock-in signal was received, i.e., pair 62*c*–62*d*; and
  (c) Places a signal on path AR1*b*, identifying itself to SP22.

(21) SP22 picks up this signal as it scans and responds thereto by sending a coded signal over path AR1*c* which marks AR1 to request the incoming signal unit to identify itself.

(22) AR1 over paths 62*b*, 66*a*, and TS1X requests TS1 to identify itself to SP22.

(23) TS1 places a signal on lead 80*a* identifying itself to SP22 as SP22 scans this lead, thus enabling SP22 to "know" that the "incoming" signal unit represents a trunk rather than a line and thus to "know" that the call is a trunk-to-trunk call which does not require lock-in.

(24) In response thereto SP22 places coded signals on path 26 to CP20, giving CP20 the identity of TS1 and TS2; requesting CP20 to find the identity of the trunk circuits respectively connected thereto; to disconnect paths 66*a*, 66*b*, 70*a*, and 70*b*; and to interconnect the incoming trunk with the lock-in trunk.

(25) CP20 with the help of CM36 and SN40 executes these commands and signals over path 21 to SC22 that this has been done. Communication now takes place over paths 96 and 98.

(26) SP22 in response thereto;
  (a) Changes the 1T1 and 2T1 memory units from search busy (SB) to cut-through busy (CB) and erases the codes of 1T1 and 2T1 from the TS1 and TS2 memories.
  (b) Sends a coded signal over path AR1*c* to AR1, marking AR1 to request all other signalling units connected to AR1 and associated with outgoing trunks beside TS2, which received the Lock-in signal, to identify themselves to SP22.

(27) AR1 places a coded signal on paths 62*d*, 62*f*, 62*h*, and 62*j* whereby this signal over path 62*f*, 74*a*, and TSL*x* to TSL, the only remaining trunk signalling unit connected to an outgoing trunk, advises TSL to identify itself to SP22.

(28) TSL identifies itself over path 84'*a*.

(29) SP22 in its scanning procedure picks up the identify 84'*a* and in response thereto:
  (a) Sends a coded signal over path 84' to TSL, marking TSL to pass the release signal out over the trunk.
    (I) TSL passes the release signal from SSG 42 over path 46, through TSL, path 76, trunk circuit 14B, out over trunk LT1.
  (b) Knowing that it has picked up all identities of outgoing trunks associated with the call, sends a coded signal over path 26, marking CP 20 to disconnect TSL from the address regenerator connected thereto. This coded signal includes digits identifying TSL.
    (I) CP20 by consulting CM36 finds out what address regenerator, i.e., AR1, is connected to TSL; and via 36, 38, and 40 disconnects paths 74*a* and 74*b*.

(30) As all connections to AR1 on its "incoming" and "outgoing" pairs have been disconnected, AR1:
  (a) Signals SP22 via path AR1*b*.
  (b) Places the idle signal on path 62*w* to the scanner, thus becoming available to serve another call.

(31) SP22 in response thereto:
  (a) Makes itself eligible on path 21 to serve another call.
  (b) Signals CP20 on path 26.
    (I) CP20 makes itself eligible to respond to another call via path 19.

(32) When the release verification signal is received over trunk LT1 and ceases, trunk unit 14*b* becomes disconnected from TSL, the memories are erased, and trunk circuit 14*b* places the idle signal on path 91*b*, as will be understood from what has gone before.

*Release of equipment responsive to receipt of the release signal by a trunk (trunk-to-trunk call)*

Assume that trunks 1T1 and 2T1 have been in communication and that, at the conclusion of communication, the release signal is received over path 15 of trunk 1T1 to trunk circuit 14.

(1) After an interval which allows the release signal to pass over trunk 2T1, trunk circuit 14 places a signal indicating reception of the release signal on path 91, which signal is picked up by scanner 18.

(2) Scanner 18, with the help of SM17, which has therein an indication of the last condition of trunk 1T1, notifies CP20 over path 19 that trunk 1T1 has received the release signal.

(3) CP20 in response thereto:
  (a) Consults CM36 to determine the identity of the lines or trunks connected to 1T1 and discovers that trunk 2T1 is connected thereto.
  (b) With the help of CM36 and SN40 connects the release conductor 93 to path 14Z whereby the release signal goes out over trunk 1T1 as the release verification signal until the release signal ceases; and connects the release conductor 93 to path 14A*z* whereby the release signal goes out over trunk 2T1 until the release verification signal is received.
  (c) Over path 21 advises SP22 by coded signals:
    (I) To remove the called address 84466 from the trunk 1T1 memory.
    (II) To remove the called address 84466 from the trunk 2T1 memory.

(d) Makes itself available over path 19 to handle the next call.

(4) When the release signal ceases coming over trunk 1T1, trunk circuit 14 places an indication to this effect on path 91 which is picked up by the scanner 18.

(5) Scanner 18 with the help of SM17, which has therein an indication of the last condition of trunk 1T1, notifies CP20 over path 19 that the release signal has ceased coming into trunk 1T1.

(6) CP20 in response thereto:

(a) With the help of CM36 and SN40 disconnects the release conductor from path 14Z.

(b) Over path 21 advises SP22 by coded signals to remove the cut-through busy indication (CB) from the trunk 1T1 memory.

(7) When trunk 2T1 receives the release verification signal back over path 15*a* of the trunk, trunk circuit 14A places a signal on path 91*a* indicative of this fact, which is picked up by scanner 18.

(8) Scanner 18 with the help of SM17, which has therein an indication of the last condition of trunk 2T1, notifies CP20 over path 19 that trunk 2T1 has received the release verification signal.

(9) CP20 in response thereto:

(a) With the help of CM36 and SN40 disconnects the release conductor 93 from path 14Az.

(b) Makes itself available over path 19 to handle the next call.

(10) When the release verification signal ceases, trunk circuit 14A places a signal on path 91*a* indicative of this fact, which is picked up by scanner 18.

(11) Scanner 18, with the help of SM17, notifies CP20 that the release verification signal has ceased.

(12) CP20 in response thereto:

(a) Over path 21 advises SP22 by coded signals to remove the cut-through busy indication (CB) from the trunk 2T1 memory.

(b) Makes itself available over path 19 to handle the next call.

In the event that trunk 2T1 had received the release signal first after communication, the functioning of the equipment would have been ismilar.

*Call in progress to the same address—collision (trunk-to-trunk call)*

Reviewing briefly, on an incoming call over trunk 1T1, trunk circuit 14 places the "off-hook" condition on path 91 whereby scanner 18 picks up the call and notifies CP20. CP20 notifies SP22 and effects the connection of trunk circuit 14 to an idle trunk signalling unit, such as TS1, which signals SP22. SP22 adjusts the 1T1 trunk memory and the TS1 trunk signalling unit memory and passes digits received from TS1 to the scratch pad memory which stores the called address received over trunk 1T1. Thereupon SP22 compares the called address in the scratch pad memory with the called addresses in the B-memories.

Referring to FIGURE 5B, as 1T1 is the calling trunk, it will not have 84466 as yet in the B-memory part of its "word" memory. We shall assume, for example, however, that line L1 and trunks 2T1 and LT1 each has the called address 84466 in the B-memory part of its "word" memory.

Accordingly, SP22 compares the called address 84466 in SP1, for example, with the addresses in the B-memories in sequential fashion from left to right in a complete scan of the B-memories.

Referring back to the outline which appears herein, if SP22 finds at least one "word" memory with the called address 84466 in the B-memory portion thereof having the search-busy indication, SP22 will initiate operations to return only the release signal back over the incoming trunk 1T1. However, if a complete scan of the word memories reveals that all word memories having the called address 84466 in the B-memory portion thereof have the cut-through busy indication, SP22 will initiate operations to return the lock-in signal followed by the release signal back over the incoming trunk 1T1.

Assuming first, that SP22 in its scanning finds the called address 84466 in the B-memory portion of the memory "word" for line L1, it investigates the SB and CB registers associated therewith. Assuming further that SP22 finds the line L1 memory with its search busy memory SB activated, the sequence is as follows:

(1) SP22 signals TS1 over path 80 to pass the release signal out over the incoming trunk.

(2) TS1 passes the release signal on path 46 out over trunk 1T1.

(3) When the release verification signal is received back over trunk 1T1 to TS1, trunk signalling unit TS1 stops passing the release signal.

(4) When the release verification signal ceases, TS1 signals this fact to SP22 over path 80*a*.

(5) SP22 in response thereto:

(a) Over path 26 signals CP20 that the release verification signal received in TS1 has ceased.

(6) CP20 in response thereto:

(a) Consults CM36 to determine the identity of the trunk connected to TS1.

(b) With the help of CM36 and SN40 disconnects 1T1 from TS1.

(c) Over path 21 advises SP22 of such disconnection.

(7) SP22 erases the trunk code 101 of trunk 1T1 from the TS1 memory (see FIGURE 5B).

Going back and assuming, however, that SP22 found the called address 84466 in the B-memories of L1, 2T1, and LT1 but also found the associated CB memories all activated and in a complete scan found no other B-memories having this address with the SB memory activated, the sequence is as follows:

(1) SP places coded signals on path 80 advising LS1 to pass the lock-in signal from path 48 out over the incoming trunk 1T1.

(2) TS1 passes the lock-in signal from path 48 out over trunk 1T1. This signal is passed back from office E to office A, causing office A to stop sending the called address and to "forward release" the redundant trunk in path AB which in turn forward releases any trunks-outgoing from office B which might be engaged with the call, etc., thus stopping the forward spread of the call. If a number of offices are serially in the path, the lock-in signal causes the offices to cut-through in sequence, releasing redundant outgoing trunks from the offices; and when it reaches the originating office, stops the sending of the called address.

(3) When the lock-in verification signal is received back over trunk 1T1 and received by TS1, trunk signalling unit TS1 ceases sending the lock-in signal and places coded signals on path 80, notifying SP22 of this fact.

(4) SP22 in response thereto places coded signals on path 80*a* advising TS1 to pass the release signal from path 46 out over the incoming trunk 1T1.

(5) The release signal is received in office A; and office A returns the release verification signal to office E. If a number of offices were serially in the path, the release signal would be received in all offices causing each to initiate release of interconnecting incoming and outgoing trunks.

(6) When the release verification signal is received over trunk 1T1 in office E (FIGURE 3), TS1 receives this signal, ceases sending the release signal.

(7) When the release verification signal ceases, TS1 places signals on path 80*a* advising SP22 of this fact.

(8) SP22 over path 26 advises CP20 that TS1 has finished receiving the release verification signal and should be disconnected.

(9) CP20 in response thereto:

(a) Consults CM36 to determine the identity of trunk 1T1 connected to TS1.

(b) With the help of CM36 and SN40 disconnects 1T1 from TS1 by disconnecting paths 66 and 68.
(c) Via path 21 advises SP22 that this disconnection has been accomplished and as to the identity of 1T1 and TS1.

(10) SP22 in response thereto removes the trunk 1T1 code 101 from the TS1 memory.

*All outgoing trunks busy (trunk-to-trunk call)*

In the example set forth hereinbefore in which an incoming trunk call from Office A and route AE was spread over outgoing trunks, such as EI, EF, to other offices in the system in the search for the desired end instrument E3 having address 84466, it was assumed that an idle trunk was available for spreading the call in such manner.

It is now assumed that each of the outgoing trunks at office E is busy, and the following description sets forth the manner in which the equipment operates in response to the detection of the busy condition.

(1) In the tracing of a trunk-to-trunk call in the example set hereinbefore, it will be recalled that SP22 over path 23 placed the called address (84466 in the present example) in the B-memory of trunk 1T1 opposite the calling trunk designator (such as 101) in the 1T1 column, and CP20 with the help of the scanner and status memory searched for an idle trunk in each outgoing route, finding trunks 2T1 and LT1.

However, if it is impossible to find an idle trunk from office E, CP20 notifies SP22 which (a) disconnects TS1 from SPM52;
(b) erases the called address 84466 from the register SP1 in SPM52;
(c) erases the called address 84466 from the B memory of trunk 1T1;
(d) signals TS1 to pass the release signal from conductor 46 out over the calling trunk 1T1.

(2) When the release signal is received back over the calling trunk 1T1 as the release verification signal, TS1 takes cognizance thereof and ceases passing the release signal out over trunk 1T1.

(3) When the release verification signal ceases, TS1, signals SP22.

(4) SP22 signals CP20 of such operation.

(5) CP20 (a) effects the disconnection of the trunk circuit 1T1 from TS1; (b) notifies SP22 of such operation.

(6) SP22 removes the SB busy from the 1T1 trunk memory; and the trunk code 101 from the TS1 memory.

*Release by incoming trunk prior to return of lock-in or release signal over outgoing trunk (trunk-to-trunk call)*

In the description of the call that was being spread from incoming trunk 1T1 to outgoing trunks 2T1 and LT1 above, the example was given of the operation of the system responsive to the receipt of a lock-in signal over a trunk (2T1 in the example).

(1) In the event that the incoming trunk 1T1 releases before the lock-in signal or the release signal is received back over a trunk 2T1 or 1T1, TS1 upon receiving the release signal is operative to notify SP22 over path 80*a*.

(2) SP22 in response:

(a) Erases the called address from the 1T1 memory.
(b) Over path 80 signals TS1 to request the connected address regenerator to stop forwarding the called address and identify itself.

(3) TS1 over paths TS1*z*, 66*b*, and 62*a* requests AR1 to stop forwarding the called address and identify itself to SP22.

(4) AR1 disconnects path 62*a* from paths 62*d*, 62*f* 62*h*, and 62*j*, thus stopping spread of the call and identifies itself to SP22 over path AR1*b*.

(5) SP22 over path AR1*c* requests AR1 to have the trunks connected to the "outgoing" pairs identifying themselves. The sequence from here on is similar to that already described in relation to a local-to-trunk call.

*Operation of equipment at an office with failure of receipt of a lock-in signal and responsive to receipt of a release signal over all outgoing paths—FIGURE 1D (trunk-to-trunk call)*

In the example in which the spreading of a call from the office E over the paths EF and EI, was described earlier herein, the operation of the system in response to the return of a lock-in signal was set forth. It is now assumed that no lock-in signal is received, and that a release signal is received over each of the outgoing trunks (trunks 2T1 and LT1 in this example). The resultant operation is represented in the basic schematic showing of FIGURE 1D.

In order to simplify the description, reference is made first to the operation of the system as the release signal is received over one of the trunks, and thereafter the manner in which the system is operative as the release signal has been received over all of the outgoing trunks.

Assuming now that the release signal is received over the trunk 2T1, trunk signalling unit TS2 connected thereto detects the release signal over path 70 and in turn notifies SP22 over path 84*a*.

(1) SP22 in response thereto:

(a) notifies CP20 over path 26;
(b) over path 23 effects the erasure of the called address from the B-memory of trunk 2T1.

(2) CP20 via CM36 controls SN40 to effect disconnection of TS2 from AR1, and notifies SP20 of such disconnection.

(a) SP20 via path 84 signals TS2 to pass the release signal from path 46 out over trunk 2T1 as the release verification signal. SP22 and CP20 become free to handle another call.

(3) Upon termination of the release signal from the distant end, TS2 over path 84*a* notifies SP22, which:

(a) over path 84 notifies TS2 to cease passing the release signal from conductor 46; and
(b) over path 26 notifies CP20.

(4) CP20 in response (a) with the help of CM36 and SN40 disconnects TS2 from 14A by interrupting paths 70 and 72;
(b) notifies SP22 over path 21.

(5) SP22 is operative thereupon to remove the search busy marking and the called address from the trunk memory for 2T1 and the 2T1 code 201 from the memory for TS2, making the trunk available for use in another call.

(6) As a consequence of receipt of the release signal over trunk LT1, in similar fashion:

(a) The called address is erased from the B-memory of LT1;
(b) TSL becomes released from AR1;
(c) The release verification signal is passed out over trunk LT1;
(d) The release signal ceases coming in over LT1;
(e) TSL becomes disconnected from 14B;
(f) The search busy marking and the called address are removed from trunk memory for LT1 and the LT1 code is removed from the memory for TSL.

(7) As all of the outgoing trunks associated with the call have been released, all of the connections to the "outgoing" circuits of AR1 will have been removed whereby AR1 is enabled to place a signal on path AR1*b* to SP22 indicating to SP22 that a release signal has been received over each outgoing trunk associated with the call.

(8) SP22 in response thereto:

(a) Places coded signals on path AR1*c*, marking AR1 to have the signalling unit connected to the "incoming" pair identify itself.

(9) AR1 places a signal on path 62*b* advising TS1 to identify itself.

(a) TS1 places a signal on path 80*a*, identifying itself to SP22.

(10) SP22 in response:

(a) Checks the TS1 memory to find that trunk 1T1 is connected to TS1;

(b) Over path 23 erases the called address 84466 from the B-memory of 1T1;

(c) Notifies CP20 over path 26, giving CP20 the identity of TS1 and AR1;

(d) Signals TS1 over path 80 to pass the release signal out over trunk 1T1.

(11) CP20 responds thereto and:

(a) With the help of CM36 and SN40:

(I) Disconnects TS1 from AR1.

(A) AR1 thereupon, having all its input and output pairs disconnected, places the idle signal on path 62*w* to scanner 18.

(12) When the release verification signal is received back over trunk 1T1, signalling unit TS1 receives this signal, stops passing the release signal and places coded signals on path 80*a*.

(13) SP22 picks up this indication and notifies CP20 that TS1 has noted the cessation of the verification signal,

(14) CP20 in response:

(a) With the help of CM36 and SN40 disconnects 1T1 from TS1;

(b) Notifies SP22 over path 21 of the disconnect.

(15) SP22 over path 23:

(a) Removes the busy marking from the search busy memory SB associated with trunk 1T1;

(b) Removes the trunk 1T1 code from the TS1 memory.

TRUNK-TO-LOCAL CALL (Figure 4)

Referring to FIGURE 4, which may illustrate office F, it is now assumed that a trunk, such as 2T1, is seized over the distant end causing the trunk circuit 14A to place the seize indication on the path 91*a* to the scanner 18. This may be the extension of the call from office E over trunk 2T1 in path EF from office E to office F.

The scanner 18 in its continuous scanning operation detects the seize condition of the trunk 2T1, and, by processes already described under the "Trunk-to-Trunk" call, the calling trunk 2T1 becomes connected to an idle trunk signalling unit, such as TS1 over paths 110 and 112, and the called address 84466 as received is transmitted over path 78 to SP22 which accumulates the address in the SPM52.

(1) SP22:

(a) Compares the called address in SPM52 with the addresses in the B-memories 56 and A-memories 24;

(I) It is assumed that no other call to the same address is in progress in the office and accordingly the called address is not in the B-memories;

(II) The called address 84466 will be found in the A-memories 24, SP22 determining thereby that the call is to a local line having thereon a station which may be end instrument E3;

(III) It is also assumed at this time that SP22 does not find the called address busy (SB or or CB) in the A-memories 24.

(b) Places the called address 84466 in the B-memory of trunk 2T1;

(c) Actuates the search busy memory SB of the trunk memory associated with trunk 2T1;

(d) Marks the memory of line L1 having called address 84466 as in the search busy condition;

(e) Places the trunk code 201 of trunk 2T1 in the TS1 memory; and (f) Signals TS1 over path 80 to pass the lock-in signal which is a continuously repeating signal from conductor 48 out over the OUT-portion of the incoming trunk 2T1. This transmission of the repeating lock-in signal continues and is passed backward through the intervening offices, such as office E (FIGURE 3), as the office(s) "cut-through" until it reaches the calling office, such as office A (FIGURE 2). As the lock-in signal is received in the intervening office(s) any redundant outgoing trunks associated therewith not yet released become released, as noted in the earlier description.

(2) Upon reception of the lock-in-signal:

(a) Ceases the forwarding of the called address, thus stopping the spread of the call in the saturation signalling network, and releases any redundant trunks outgoing therefrom; and (b) Sends the lock-in verification signal over the established path in the manner described earlier and in the present instance the signal arrives at the IN-portion of trunk 2T1 and passes through SN40 to TS1 which ceases sending the lock-in signal.

(3) When the originating office A detects that the lock-in signal has ceased, it discontinues the lock-in vertification signal, (4) When TS1 detects the cessation ofthe lock-in verification signal, it signals SP22 of the cessation.

(5). SP22.

(a) Changes the L1 and 1T1 memories from search busy (SB) to cut-through busy (CB); and (b) Signals CP20 that the lock-in verification has been received by TS1 and ceased and passes the line code 701 to CP20.

(6) CP20 responsively:

(a) Via CM36 and SN40:

(I) Effects the disconnection of TS1 from the trunk circuit 14A by discontinuing the connections over paths 110, 112;

(II) Connects the OUT-portion of the line circuit 12 for line L1, which is assumed in this example to be the called line, to the ring conductor 97 whereby the called station E3 is signalled;

(III) Connects path 14A*z* of the OUT-portion of trunk 2T1 to the ringback conductor 99, whereby the ringback signal is passed over the trunk 2T1 to notify the calling station E1 that the called station E3 is being signalled (rung), interconnects line L1 and trunk 2T1 via paths 116 and 114; and (b) Signals SP22 that 2T1 is disconnected from TS1. CP20 becomes free to handle another call.

(7) SP22 erases the code of trunk 2T1 from the TS1 memory.

(8) Scanner 18 at office F monitors the called line L1 for answer by station E3 on line L1.

(9) When E3 on line L1 goes "off-hook" in answering, line circuit 12 places the "off-hook" indication on path 13 whereby scanner 18 detects such condition and notifies CP20.

(10) CP20 via CM36 and SN40:

(a) Disconnects the line circuit of the called line L1 from the ring lead 97;

(b) Disconnects the path 14A*z* of trunk circuit 14A from the ring-back lead 99; and momentarily connects it to answer signal lead 99*a* for a spurt of answer tone.

(11) The line circuit 12 and trunk circuit 2T1 cut-through communication then follows.

(12) Release occurs in a manner which would be understood from what has been described.

*Called address busy (trunk-to-local call)*

On the trunk-to-local call described hereinbefore, the call was incoming over trunk 2T1 to trunk circuit 14A which became connected to TS1, whereby the called address was placed, by means of SP22, in SPM52. Thereupon SP22 effected a comparison of the called address in SPM52 with the addresses in the B-memories and the A-memories of 23M and found the called address idle.

We shall assume now, however, that the called line was found busy instead of idle. This busy condition can be caused by different situations revealed in the scanning process. More specifically, referring again to the outline found on pages 16 and 17:

(1) SP22 scans the line and trunk memories, on each step looking for the called address in the B-memory portion and observing the SB and CB memory portions.
 (a) Assuming that the called address is found in a B-Memory (indicating that a local line or trunk is engaged in a call to the same address, or that the line having this address is engaged in a call to another local line),
  (I) If the scanned memory is in the SB-mode, SP22 stops the scan and initiates the sending of the release signal over the calling trunk.
  (II) If the scanned memory is in the CB-mode, SP22 continues the scan; and if a complete scan of the line and trunk memories shows that all scanned memories having the called address in the B-memories are in the CB-mode, SP22 effects the sending of the lock-in signal over the calling trunk and after receipt of the lock-in verification signal back over the trunk, effects the sending of the release signal over the calling trunk.
 (b) Assuming that the called address is not found in a B-memory,
  (I) SP22 scans the line and trunk memories again, on each step looking for the called address in the A-memories, and observing the SB and CB memories.
   (A) Assuming that the called address is found in an A-memory, SP22 stops the scan and initiates the sending of the lock-in signal over the calling trunk. (1) Assuming that the scanned memory has the SB or CB indication, indicating that the called line is already engaged in a call to a trunk, after reception of the lock-in verification signal, SP22 initiates the sending of the release signal over the calling trunk.

CASE 1. RELEASE SIGNAL SENT OVER INCOMING TRUNK (1) SP22
 (a) Erases the called address from SPM52;
 (b) Places a coded signal over path 80 to TS1, marking TS1 to pass the release signal over the incoming trunk.
 (c) Makes itself available to handle another call over path 21.
(2) TS1 passes the release signal from lead 46 out over trunk 2T1 via paths 112, 14AZ, 14A, and **16*a***.
(3) When the release verification signal is received back over trunk 2T1 via **15*a*, 14A, 14AZ, and 110, TS1 ceases sending the release signal and when the release verification signal ceases, notifies SP22 via path 80*a***.
(4) SP22 in response:
 (a) Erases the trunk code 201 of trunk 2T1 from the TS1 memory;
 (b) Via path 26 signals CP20 that TS1 has received the release verification signal.
(5) CP20 in response:
 (a) Consults CM36 to determine what trunk is connected to TS1;
 (b) Via CM36 and SN40 disconnects paths 110 and 112 between 2T1 and TS1.
 (c) Signals SP22 that trunk 2T1 has been disconnected;
 (d) Makes itself available to handle another call via path 19.
(6) SP22 removes the search busy indication from the trunk 2T1 memory.

This releases connections back to the preceding office, allowing any further consequence to be determined by conditions in the preceding office.

CASE 2. LOCK-IN SIGNAL FOLLOWED BY RELEASE SIGNAL (1) SP 22
 (a) Erases the called address from SPM52;
 (b) Places a coded signal over path 80 to TS1, marking TS1 to pass the lock-in signal followed by the release signal over the incoming trunk;
 (c) Makes itself available to handle another call over path 21.
(2) TS1 passes the repeating lock-in signal on path 48 out over the trunk 2T1. This causes the preceding office to cut-through and release any redundant trunks not already released, if any. As an office cuts-through, the lock-in signal passes back to the next preceding office, etc., until it reaches the originating office, whereupon the originating office ceases sending the called address, stopping the spread of the call; forward releases any redundant paths, if any, not already released, which in turn forward releases any redundant paths through other offices; and sends the lock-in signal as the lock-in verification signal over the lock-in path to the terminating office.
(3) When this lock-in verification signal comes in over trunk 2T1, the connected trunk signalling unit TS1 receives the same and
 (a) Ceases passing the lock-in signal;
 (b) Passes the release signal from path 46 out over trunk 2T1. As all preceding offices have cut-through, this signal is received by all offices simultaneously. This path may be traced back from office F (FIGURE 4) through office E (FIGURE 3) to office A (FIGURE 2) as follows: release signal path 46 (FIGURE 4), TS1, path 112, path **14A*z*, trunk circuit 14A, path 16*a*, over trunk 2T1 to path 15*a* of office E (outgoing path 16*a* of office F being connected to incoming path 15*a* of office E), 14A, 14AX, path 98, 14Z, 14, path 16 over trunk 1T1 to path 15 of office A, 14, 14X, path 66 to ST1** in office A. If this repeating signal is received for a predetermined timed interval in a given office, it will be recognized. Each originating or tandem office sends the release verification signal over the trunk by which it received the release signal. Each tandem office re-sends the release signal over the originating trunk which handled the call. More details may be gained by reference to the before mentioned patent.
(4) When the release verification signal is received in office F (FIGURE 4) back over path **15*a* of trunk 2T1 this signal passes over path 110 to TS1**.
(5) TS1 in response:
 (a) Ceases sending the release signal.
 (b) After the release verification signal ceases, signals the fact that it has received the release verification signal to SP22 over path **80*a***.
(6) The sequence from here on is similar to that described in Case 1.

*No answer (trunk-to-local call)*

If, as previously described, a call comes in over trunk 2T1 bound for end instrument E3 over called line L1, and the ring signal is sent to E3 and ring-back signal is sent to trunk 2T1, but scanner 18 does not detect an answered condition of the called line L1 during a predetermined time ringing period, at the end of the timed ringing period, scanner 18 signals CP20.

(1) Cp20:
  (a) Via CM36 and SN40 switches path 14Az of the OUT-Portion of 2T1 from the ring-back conductor 99 to the release conductor 93;
  (b) Disconnects path 12Z of line circuit 12 from the ring conductor 97;
  (c) Disconnects 114 and 116;
  (d) Signals SP22,
    (I) Sp22:
      (A) Removes the search busy indication from L1 memories;
      (B) Erases the called address from the trunk 2T1 memory.
(2) When the distant end of trunk 2T1 releases, trunk circuit 14A associated with trunk 2T1 places the release verification marking on lead 91*a* to scanner 18.
(3) When scanner 18 detects the release verification marking on lead 91*a*, it signals CP20 which disconnects path 14Az from release conductor 93. CP20 becomes free.
(4) When scanner 18 detects the cessation of the release verification signal on lead 91*a*, it again signals CP20.
(5) CP20 in response signals SP22 which removes the search busy indication from the 2T1 memory.

MISCELLANEOUS

As a modification of the system illustrated, the seize signal and release signal can be the same signal whereby if a trunk is unable to return the seize signal as the seize acknowledge signal, after a predetermined time reception by the trunk of the seize signal, the trunk may interpret the repeating seize signal as the release signal.

It should be appreciated that various changes, rearrangements and modifications may be made without departing from the scope of the invention, as defined by the appended claims.

What is claimed is:

1. In a saturation signalling network comprising a plurality of offices containing lines, interconnected by groups of trunks, and in which a call incoming to a first office for a line in another office as represented by a called address is forwarded over an available idle trunk in each route outgoing from said first office in a search for the called line and in which a lock-in signal is sent back from the destination office upon arrival of the called address thereat: the improvement comprising signalling means including means in said first office for transmitting a first signal set back over the incoming trunk if another call to the same address is in a search busy mode, and transmitting a second signal set back over the incoming trunk if the other call to the same address is in the cut-through busy mode.

2. A saturation signalling system for spreading a call over a network of paths between offices in a search for a called address comprising a memory means for an incoming trunk in an office including a first memory means (search busy) for indicating use of the trunk in a call in progress in a search busy mode, and a second memory means (cut-through busy) for marking said trunk in use for calls in progress to said address in a cut-through busy mode, and signal means including means for transmitting a release signal back over the incoming trunk if another call to the same address is in the search busy mode, and transmitting a lock-in signal and a subsequent release signal back over the incoming trunk if another call to the same address is in the cut-through busy mode.

3. In a saturation signalling telephone system comprising offices interconnected by communication paths, each of which offices includes control means having memory means comprising at least search busy memory means, cut-through memory means, and call-in progress memory means for each path in said office, scratch pad memory means, signal processor means including means for marking a path busy in said search busy memory means with initiation of a call, means for registering the desired address in said scratch pad memory, means for checking said address in said scratch pad memory against the addresses registered in said call-in-progress memory means, and for simultaneously checking busy indications in said search busy and said cut-through memories for trunks having said address in said call in progress memory means, and means in said signal processor means for initiating a different signal set back over the incoming trunk over which the called address was received responsive to the detection of a busy condition in a different one of said search busy or cut-through memory means.

4. In a saturation signalling telephone system comprising offices interconnected by communication paths, each of which offices includes control means having memory means comprising at least search busy memory means, cut-through memory means and call in progress memory means for each path in said office, scratch pad memory means, signal processor means including means for marking a path busy in said search busy memory means with initiation of a call, means for registering the desired address in said scratch pad memory, means for checking said address in said scratch pad memory against the addresses registered in said call in progress memory means, and for simultaneously checking indications in said search busy and said cut-through memories for trunks having said address in said call in progress memory means, and means in said signal processor means responsive only to detection of the called address in the call in progress memory means, and the absence of a busy indication in the search busy memory means to initiate transmission of a lock-in signal and a subsequent release signal back over the incoming trunk.

5. In a saturation signalling telephone system comprising offices interconnected by communication paths, each of which offices includes control means having memory means comprising at least search busy memory means, cut-through memory means, and call in progress memory means for each path in said office, scratch pad memory means, signal processor means including means for marking a path busy in said search busy memory means with initiation of a call, means for registering the desired address in said scratch pad memory, means for checking said address in said scratch pad memory against the addresses registered in said call in progress memory means, and for simultaneously checking for busy indications in said search busy and said cut-through memories for trunks having said address in said call in progress memory means, and means in said signal processor means responsive to detection of the called address in the call in progress memory, and a busy indication in the cut-through memory means, to initiate transmission of a lock-in signal back over the incoming trunk and thereafter a release signal.

6. In a saturation signalling communication system comprising offices serving lines interconnected by trunk groups, means in each office including control means responsive to receipt of an incoming call for a line having a non-local called address to spread the call over an idle trunk if availabe in each outgoing route from said office, memory means comprising at least search busy memory means, cut-through memory means, and call-in-progress memory means for each line and trunk in said office, scratch pad memory means, signal processor means including means for marking a trunk busy in said search busy memory means with initiation of a call, means for registering the called address in said scratch pad memory, means for checking said address in said scratch pad memory against the addresses presently registered in said call-in-progress memory means, and simultaneously therewith for checking busy indications in said search busy memory means and said cut-through memory means for lines and trunks having said address in said call progress memory means, means for transmitting a first signal set back over the incoming trunk over which the called address was received responsive to detection of a busy condition in a search busy memory means, and a different signal set back over the said incoming trunk responsive to detection of a busy condition in the cut-through memory means and means for extending the call over an available idle trunk in each outgoing path to another office in the absence of said address in said call-in-progress memory means including address regenerator means for repeatedly transmitting said called address over a plurality of output circuits, means for connecting each of said output circuits to a different outgoing trunk, said address regenerator means being operative with the release of all of the connected trunks to signal the signal processor means that all trunks have been released.

7. In a saturation signalling network comprising a plurality of offices containing local lines interconnected by groups of trunk lines, and in which a call incoming to a first office for a local line in another office as represented by a called address is forwarded over an idle trunk line, if available, in each route outgoing from said first office in a search for the called local line: means in said first office including individual memory means for each line connected thereto, said individual memory means including at least search busy memory means, cut-through busy memory means, local address memory means, call-in-progress memory means; a plurality of common temporary memory means; means for storing a search busy indication in said search busy memory means with initiation of an incoming call, means for storing the called address in one of the temporary memory means with receipt of the called address, means for comparing the address in the temporary memory means with the addresses in the call-in-progress memory means of the various lines, and simultaneously checking the search busy and cut-through busy memories, means responsive to detection of a busy indication for the called address in the cut-through busy memory means to initiate transmission of a lock-in signal back over the incoming trunk and thereafter a release signal, and responsive to detection of a busy indication in the search busy memory means to transmit a release signal back over the incoming trunk, means operative in the absence of the called address in each call-in-progress memory means for comparing the address in said temporary memory means with the addresses in the local address memory means of the various local lines, and simultaneously checking the search busy and cut-through busy memories for the local lines, means operative in the absence of the called address in each local address memory means associated with the local lines for selecting an idle available trunk line in each route except the route over which the call was received, and placing the search busy indication in the search busy memory of each trunk line selected; means for thereafter forwarding the called address out over each of said selected trunk lines; means operative with receipt of a lock-in signal over one of said trunk lines terminate forwarding of the called address, and means removing the search busy indications in the memory for the incoming lien and said one trunk line, means for providing a cut-through busy indication in the cut-through memories thereof, and means for removing the search busy indication from the memories of the other selected outgoing trunk lines.

References Cited

UNITED STATES PATENTS 3,316,354 4/1967 Svala ------------- 179—18.21

WILLIAM C. COOPER, *Primary Examiner.*

L. A. WRIGHT, *Assistant Examiner.*